United States Patent
Kanenari et al.

(10) Patent No.: US 8,798,853 B2
(45) Date of Patent: Aug. 5, 2014

(54) TIRE CONDITION MONITORING SYSTEM AND INSTALLATION POSITION ASCERTAINING METHOD

(75) Inventors: Daisuke Kanenari, Kanagawa (JP); Yasuhiko Araki, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 282 days.

(21) Appl. No.: 13/287,694

(22) Filed: Nov. 2, 2011

(65) Prior Publication Data

US 2012/0136530 A1    May 31, 2012

(30) Foreign Application Priority Data

Nov. 30, 2010 (JP) ................................ 2010-267156

(51) Int. Cl.
*G06F 11/30* (2006.01)
*B60C 23/00* (2006.01)
*B60C 23/04* (2006.01)

(52) U.S. Cl.
CPC ........... *B60C 23/0416* (2013.01); *B60C 23/007* (2013.01); *B60C 23/0444* (2013.01); *B60C 23/0437* (2013.01)
USPC ....... 701/33.4; 701/29.1; 701/29.9; 701/31.4; 701/33.7; 701/33.8; 340/438; 340/442; 340/449

(58) Field of Classification Search
None
See application file for complete search history.

(56) References Cited

U.S. PATENT DOCUMENTS

| | | | | |
|---|---|---|---|---|
| 5,483,827 A | * | 1/1996 | Kulka et al. | 73/146.5 |
| 5,505,080 A | * | 4/1996 | McGhee | 73/146.5 |
| 5,537,090 A | * | 7/1996 | Thomas et al. | 340/443 |
| 5,731,754 A | * | 3/1998 | Lee et al. | 340/447 |
| 6,025,777 A | * | 2/2000 | Fuller et al. | 340/442 |
| 6,087,930 A | * | 7/2000 | Kulka et al. | 340/447 |
| 6,412,977 B1 | * | 7/2002 | Black et al. | 374/178 |
| 6,543,279 B1 | * | 4/2003 | Yones et al. | 73/146.5 |
| 6,960,994 B2 | * | 11/2005 | Tabata et al. | 340/442 |
| 8,035,500 B2 | * | 10/2011 | Hafele et al. | 340/447 |
| 2004/0099055 A1 | * | 5/2004 | Komatsu et al. | 73/146 |
| 2005/0199328 A1 | * | 9/2005 | Schoenberger et al. | 152/415 |
| 2007/0069877 A1 | * | 3/2007 | Fogelstrom | 340/442 |
| 2007/0156312 A1 | * | 7/2007 | Breed et al. | 701/29 |
| 2008/0252434 A1 | * | 10/2008 | Leatherman | 340/438 |
| 2012/0136530 A1 | * | 5/2012 | Kanenari et al. | 701/33.4 |

FOREIGN PATENT DOCUMENTS

| | | |
|---|---|---|
| JP | 2002-531319 A | 9/2002 |
| JP | 2008-74223 A | 4/2008 |
| JP | 2008-143490 A | 6/2008 |
| JP | 2010-525990 A | 7/2010 |

* cited by examiner

*Primary Examiner* — Khoi Tran
*Assistant Examiner* — Jonathan L Sample
(74) *Attorney, Agent, or Firm* — Global IP Counselors, LLP

(57) ABSTRACT

A tire condition monitoring system stores information representing a number of dual wheels having two tires arranged closely adjacent to each other on, for example, a commercial vehicle. The system measures internal air temperatures of the tires on all of the wheels, and stores temperatures measured when a system reset is executed as reference temperatures. The system determines calculated values based on the temperatures measured for each tire until a measured temperature exceeds the corresponding reference temperature by 20 degrees Celsius or more. The system arranges the calculated values in an order and determines that a number of the calculated values high in the order are calculated values of temperatures of tires mounted on the inside wheel. The number of calculated values corresponding to a dual wheel is equivalent to the number of dual wheels. Thus, the system determines which tires are mounted on an inside wheel.

20 Claims, 27 Drawing Sheets

| Position | 1 | 2 | 3 | 4 | 5 | 6 |
|---|---|---|---|---|---|---|
| RSSI Average [dBm] | -56.5 | -61.3 | -62.4 | -63.2 | -64.7 | -64.2 |
| Maximum Temperature Value (° C) | 38 | 36 | 35 | 41 | 39 | 35 |

| RSSI AVERAGE / TIRE POSITION | AVERAGE RSSI AT FIRST ANTENNA AT1 | AVERAGE RSSI AT FIRST ANTENNA AT2 | AVERAGE RSSI AT FIRST ANTENNA AT3 |
|---|---|---|---|
| 1 | STRONG | VERY STRONG | WEAK |
| 2 | VERY STRONG | STRONG | WEAK |
| 3, 4 | MEDIUM | VERY STRONG | MEDIUM |
| 5, 6 | MEDIUM | STRONG | STRONG |
| 7, 8 | WEAK | VERY STRONG | STRONG |
| 9, 10 | WEAK | STRONG | VERY STRONG |

FIG. 24

TIRE CONDITION MONITORING SYSTEM AND INSTALLATION POSITION ASCERTAINING METHOD

CROSS-REFERENCE TO RELATED APPLICATIONS

This application claims priority under 35 U.S.C. §119(a) to Japanese Patent Application No. 2010-267156, filed in Japan on Nov. 30, 2010, the entire contents of Japanese Patent Application No. 20010-267156 are hereby incorporated herein by reference.

BACKGROUND

1. Field of the Invention

The present invention relates to a tire condition monitoring system for a commercial vehicle having a plurality of wheels and an installation position ascertaining method for a tire condition measuring device.

2. Background Information

In the field of tire condition monitoring systems for passenger cars, there is a known technology contrived to automatically detect the positions of four wheels using a rotation direction of a tire and a received signal strength (RSSI: received signal strength indication) of a radio signal. For example, PCT Application No. 2002-531319 discloses a method of allocating identifiers contained in a plurality of signals issued from a plurality of transmitters. In order to accomplish this goal, a tire air pressure as well as an acceleration value calculated based on a wheel movement state are measured for each of the monitored wheels. In order to identify a plurality wheels on a right side of a vehicle and a plurality of wheels on a left side of a vehicle, a sine wave of an acceleration along a path B is determined and a sine wave of a change of a centrifugal acceleration Z occurring during acceleration is determined for each individual wheel. Then, products of the two sine waves determined for different wheels are compared to identify a plurality wheels on a right side of a vehicle and a plurality of wheels on a left side of a vehicle.

Additionally, signals obtained from the front wheels and signals obtained from the rear wheels are identified by comparing the strengths of signals received at each receiving antenna among a plurality of receiving antennas. A receiving antenna arranged at the wheels is monitored and signals having a higher strength are assigned to front wheels while signals having a lower strength are assigned to the rear wheels. Meanwhile, receiving antennas arranged at the rear wheels are monitored and signals having a higher strength are assigned to the rear wheels while signals having a lower strength are assigned to the front wheels. In this way, a position of a sensor is ascertained by identifying whether the sensor is located on a left wheel or a right wheel based on a phase of a sine wave of an acceleration signal and estimating whether the sensor is positioned on a front wheel or a rear wheel based on the strengths of the radio signals.

In addition, Laid-open Japanese Patent Application Publication No. 2008-74223 discloses a wheel position estimating method in which a wheel information transmitting device comprises an air pressure sensor contrived to detect wheel information, a control circuit contrived to store identification information for distinguishing the wheel on which the wheel information transmitting device is installed from other wheels, and a wheel communication device contrived to transmit identification information for the wheel on which the wheel information transmitting device is installed as wheel information and to receive identification information for other wheels from other wheel communication devices. The control circuit is contrived to compare the strengths of received signals containing identification information for other wheels to a threshold value and calculate position information indicating whether or not the wheel on which the wheel information transmitting device is installed is one wheel of a dual wheel. The wheel information transmitting device is also contrived to calculate position information indicating relative positions of the wheel on which the wheel transmitting device is installed with respect to the other wheels based on the strengths of the received signals containing identification information for the other wheels and to transmit identification for the wheel on which the wheel transmitting device is installed, identification information for the other wheels, and the aforementioned position information at a prescribed timing. In this way, a position of a dual wheel is determined using signal strengths.

Also, Japanese Translation of PCT Application 2010-525990 discloses a position determining method for determining positions of sensors on wheels (200, 300) that are installed coaxially on the same end portion of the same wheel axle of a vehicle (C) equipped with a receiving module (100) joined to a chassis of the vehicle (C). Positions of the sensors (210 and 310) are determined based on an angular spacing of 90 degrees or larger between one wheel (200) and the other wheel (300). As a result, when the vehicle (C) moves, the distances between the receiving module and the sensors change as the wheels rotate. Since a distance exists between signal emission points, an electric power of the received signals can be made to fluctuate by using a low frequency (LF) connection. Thus, the received signals can be differentiated. In other words, the positions of dual wheels are determined using the low frequency (LF) connection and the radio signal strength of the sensors as the sensors passing through a vicinity of the receiver.

Furthermore, Laid-open Japanese Patent Application Publication No. 2008-143490 discloses a system comprising a plurality of wheel condition detecting units provided to correspond to each of a plurality of wheels and contrived to transmit wheel condition information indicating a detected condition of a wheel to an external location wirelessly, a receiver that is provided on a main body of a vehicle onto which the aforementioned wheels are installed and contrived to receive the aforementioned wheel condition information, a plurality of motors each of which is provided adjacent to one of the aforementioned wheels and contrived to drive the wheel, a drive control means contrived to control operation of the motors, and a detection target wheel ascertaining means contrived to ascertain which wheel is targeted for detection by each of the wheel condition detecting units. The system determines which wheel is targeted for detection by each of the wheel condition detecting units by having the drive control means operate a prescribed motor among the plurality of motors and having the detection target wheel ascertaining means determine which wheel condition detecting unit corresponds to the wheel adjacent to the motor that was operated. More specifically, the detection target wheel ascertaining means uses wheel condition information received from the wheel condition detecting units to ascertain which of the wheel condition detecting units corresponds to the wheel whose adjacent motor operated at the time when the aforementioned prescribed motor was operated. In this way, when an in-wheel motor is operated, the wheel can be specified based on a corresponding temperature change and noise.

SUMMARY

With the method disclosed in PCT Application No. 2002-531319, it is possible to ascertain if a wheel is located on the right side of the vehicle or the left side of the vehicle based on a centrifugal force acting on the wheel and it is possible to ascertain if the wheel is a front wheel or a rear wheel based on the strengths of radio signals transmitted from each of the wheels. However, it is not possible to distinguish if a wheel is an inside wheel or an outside wheel of a dual wheel.

With the method presented in Laid-open Japanese Patent Application Publication No. 2008-74223, it is possible to ascertain if a wheel is one wheel of a dual wheel but it is not possible to ascertain whether the wheel is an inside wheel or an outside wheel.

With the method presented in Japanese Translation of PCT Application 2010-525990, it is necessary to arrange a sensor provided on an inside wheel of a dual wheel and a sensor provided on an outside wheel of a dual wheel such that a predetermined positional relationship is established between the sensors. There is a possibility that a sensor will be put in an incorrect position when a tire is changed. If the positional relationship between the sensors is incorrect, then the method may yield an incorrect determination.

The system presented in Laid-open Japanese Patent Application Publication No. 2008-143490 is intended for electric car applications and is difficult to apply to a large engine-driven vehicle having a dual wheel.

Double tires (dual wheels) are widely used on commercial vehicles and it is difficult to whether a sensor is positioned on an inside tire or an outside tire of a dual wheel with the conventional technologies explained above. Consequently, it has not been possible to determine a installation position of a tire automatically in commercial vehicles using double tires (dual wheels).

An object of the present invention is to provide a tire condition monitoring system and an installation position ascertaining method that can distinguish between an inside wheel and an outside wheel of a dual wheel used on a commercial vehicle.

With the present invention, it is possible to distinguish between a tire condition measuring device installed in an inside tire of a dual wheel used in a commercial vehicle and a tire condition measuring device installed in an outside tire. As a result, it is possible to determine an installation position of a tire automatically in commercial vehicles using double tires (dual wheels).

BRIEF DESCRIPTION OF THE DRAWINGS

FIG. 24 is a table showing average received signal strength values of signals received by the antennas from each wheel position in the third embodiment;

DETAILED DESCRIPTION OF EMBODIMENTS

Disclosed embodiments will now be explained with reference to the drawings.

In the first embodiment, a vehicle 1 has one front wheel axle shaft and one rear wheel axle shaft. One wheel 2A or 2B is provided on each end of the front wheel axle shaft 3A, and two wheels 2C to 2F are provided on each end of the rear wheel axle shaft 3B. The vehicle 1 also has a tire condition monitoring system. A method by which the tire condition monitoring system automatically ascertains a wheel mounting position will be explained. The wheels 2C and 2D arranged adjacently on a left end of the rear wheel axle shaft 3B constitute a dual wheel, and the wheels 2E and 2F arranged adjacently on a right end of the rear axle shaft 3B constitute a dual wheel. The wheels 2D and 2E are inside wheels of the dual wheels, and the wheels 2C and 2F are outside wheels of the dual wheels.

Additionally, an antenna AT1 is installed on a bottom portion of the vehicle 1 in a position frontward of the left front wheel and connected to a main apparatus 30A provided near a driver's seat. A tire condition measuring device 10A to 10F is installed in each of the wheels 2A to 2F and serves to measure a temperature and an air pressure of the space inside a tire of each of the wheels 2A to 2F.

Figure 4:
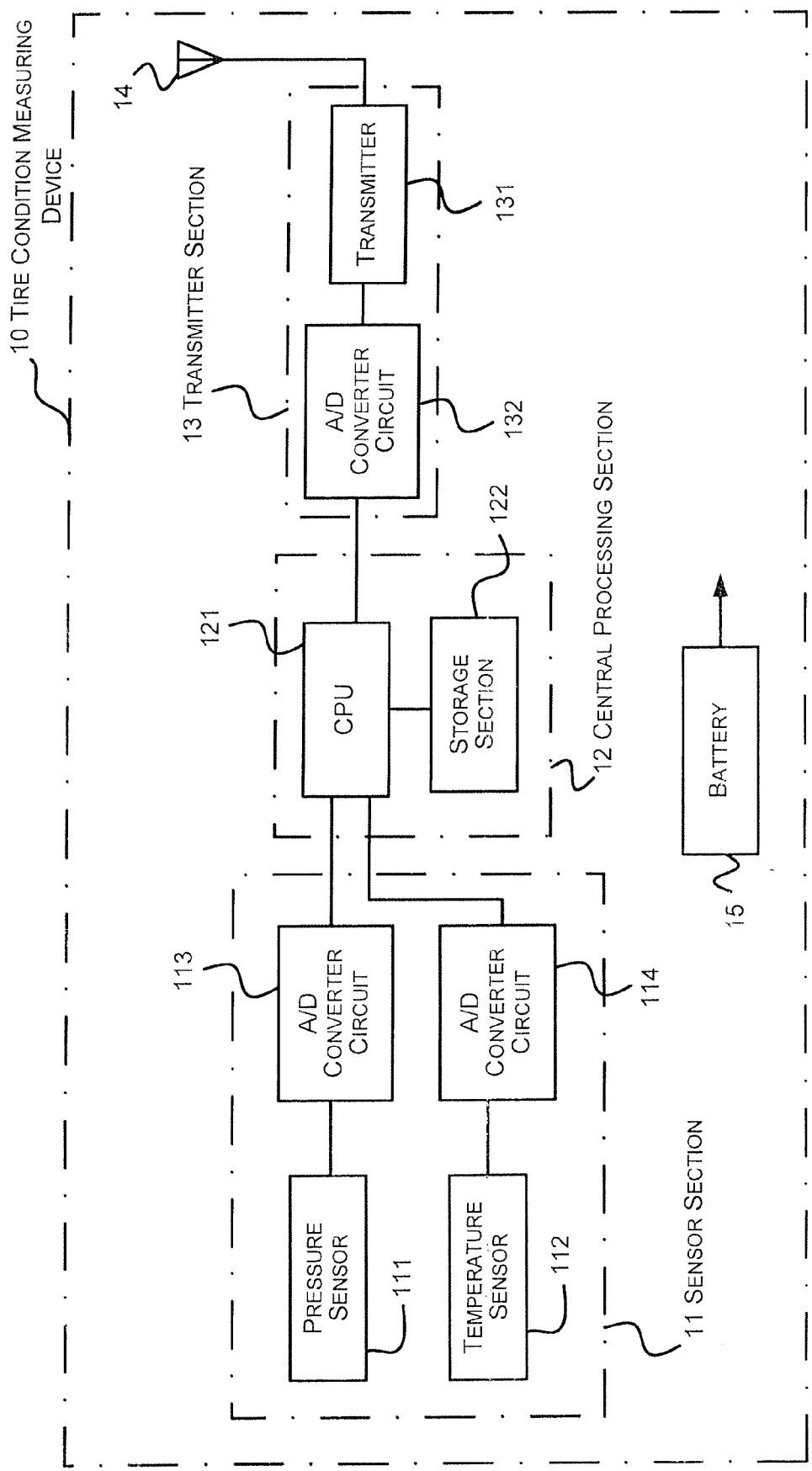
FIG. 4 is a block diagram showing an electric circuit of a tire condition measuring device according to the first embodiment.

As shown in FIG. 4, each of the tire condition measuring devices 10 (10A to 10F) comprises a sensor section 11, a central processing section 12, a transmitter section 13, an antenna 14, and a battery 15 serving as a power source for driving these components. The sensor section 11 comprises a pressure sensor 111 contrived to detect an air pressure inside a tire, a temperature sensor 112 contrive to detect a temperature inside the tire, and analog-digital (hereinafter simply "A/D") converter circuits 113 and 114.

The pressure sensor 111 detects an air pressure inside the tire and sends an analog electric signal corresponding to the detected air pressure value to the A/D converter circuit 113. The temperature sensor 112 detects a temperature inside the tire and sends an analog electric signal corresponding to the detected temperature value to the A/D converter circuit 114. The A/D converter circuit 113 converts the analog electric signal received from the pressure sensor 111 into a digital value and sends the digital value to a CPU 121 that will be explained later. The A/D converter circuit 114 converts the analog electric signal received from the temperature sensor 112 into a digital value and sends the digital value to the CPU 121 (explained later).

The central processing section 12 comprises a well-known CPU 121 and a storage section 122. The CPU 121 operates based on a program stored in a semiconductor memory of the storage section 122. When electric power is supplied and the system is driven, data detected by the sensor section 11 is transmitted wirelessly to the main apparatus 30A using an electromagnetic signal having a frequency f1 once per prescribed amount of time.

The program of the CPU 121 is contrived such that when detection data is transmitted, a header indicating that the data is detection data and identification information unique to each of the tire condition measuring devices 10 are added to the detection data to obtain transmission information. The transmission information is transmitted to the main apparatus 30A through the transmitter section 13.

The storage section 122 comprises a ROM in which the program executed by the CPU 121 is stored and a non-volatile semiconductor memory that is electrically rewritable, e.g., an EEPROM (electrically erasable programmable read-only memory). The identification information unique to each of the tire condition measuring devices 10 is stored in advance in a region designated non-rewritable inside the storage section 122 at the time of manufacture.

The transmitter section 13 comprises a transmitter 131 and a digital-analog (hereinafter simply "D/A") converter circuit 132. The transmitter 131 receives transmission information from the CPU 121, converts it to a high-frequency signal having a frequency f1, and transmits it through the antenna 14.

Figures 5, 6:
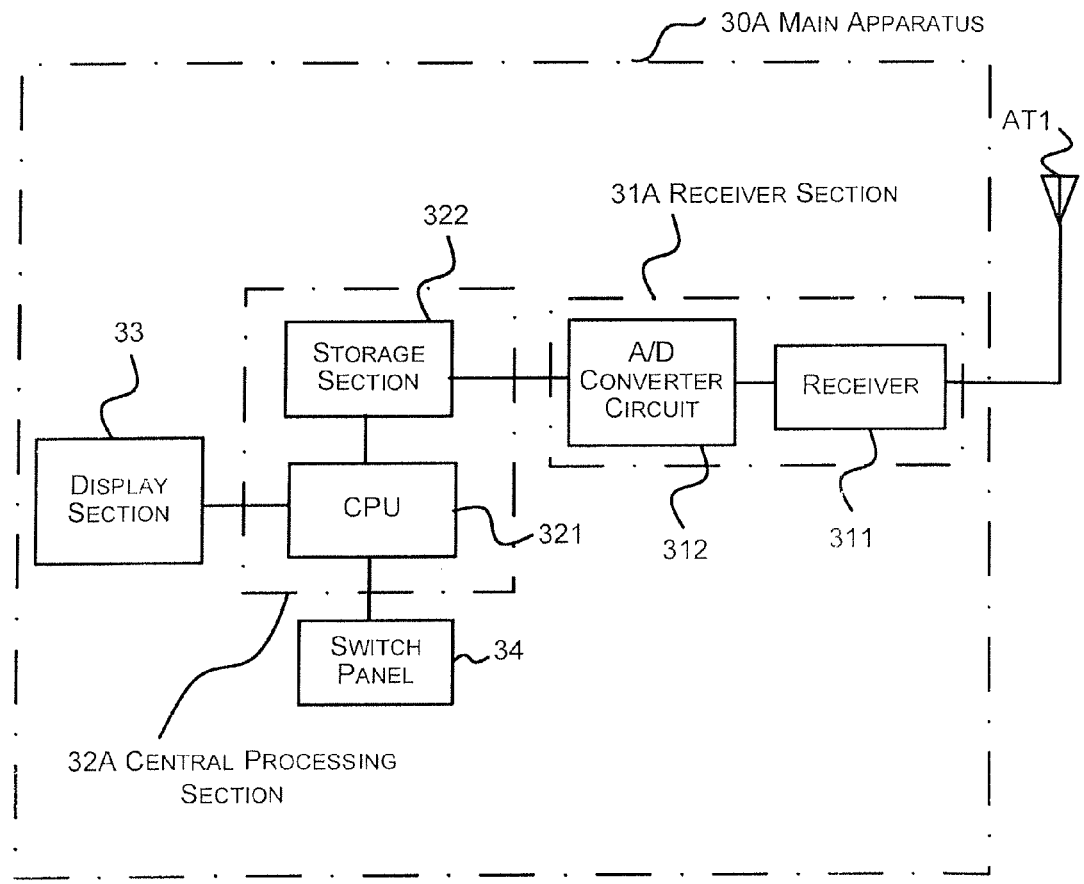
FIG. 5 is a block diagram showing an electric circuit of a main apparatus according to the first embodiment.
FIG. 6 is a table showing average received signal strength values and tire temperatures obtained at each wheel position in the first embodiment.

As shown in FIG. 5, the main apparatus 30A comprises a receiver section 31A, a central processing section 32A, a display section 33, and a switch panel 34 and these components are driven using electric power supplied from a battery of the vehicle. The receiver section 31A comprises a receiver 311 and an A/D converter circuit 312. An input side of the receiver 311 is connected to the antenna AT1. After a high-frequency electromagnetic signal having a frequency f1 has been received from the tire condition measuring devices 10A to 10F and inspected, the receiver section 31A outputs the electromagnetic signal to the central processing section 32A through the A/D converter circuit 312. The receiver section 31A also outputs a strength value of the received signal to the central processing section 32A as information indicating a received signal strength.

The central processing section 32A comprises a well-known CPU 321 and memory section 322 and serves to execute computer processing of sensor detection information received from the tire condition measuring devices 10A to 10F to obtain tire air pressure information and tire temperature information and indicate the obtained information on the display section 33. The central processing section 32A indicates the information based on identification information of the tire condition measuring devices 10A to 10F. The identification information of each of the tire condition measuring devices 10A to 10F is associated with one of the wheel installation positions stored in the storage section 322. After a reset switch on the switch panel 34 is pressed and the system has been reset, the central processing section 32A automatically executes a process of associating the tire condition measuring devices 10A to 10F installed in the tires of the wheels 2A to 2F with the wheel installation positions. This association processing will be explained in more detail later.

The storage section 322 comprises a ROM in which a program executed by the CPU 321 is stored and a non-volatile semiconductor memory that is electrically rewritable, e.g., an EEPROM (electrically erasable programmable read-only memory). Such information as a number of wheels, a number of dual wheels, and positional relationships among the installation positions of the wheels 2A to 2F and the antenna AT1 are received from an external source and stored in advance in a region designated as rewritable inside the storage section 322 when the main apparatus 30A is installed in the vehicle.

The display section 33 serves to display sensor detection information that the CPU 321 receives from each of the tire condition measuring devices 10A to 10F. The display section 33 has a display panel (not shown). Such items as a diagram of the vehicle clearly showing the installation positions of the tires, an indication of the quality of the air pressure of each of the tires expressed in three colors using red, yellow, and green, and an indication of the quality of the temperature inside each of the tires expressed in three colors using red, yellow, and green. Switching the three colors according to the quality enables one to easily recognize which of three states a tire is in, i.e., an abnormal state, a state requiring caution, or a normal state, visually. Additionally, the pressure and temperature of each tire are indicated numerically on a bottom portion of the display panel such that more detailed sensor detection information can also be known.

Figure 7:
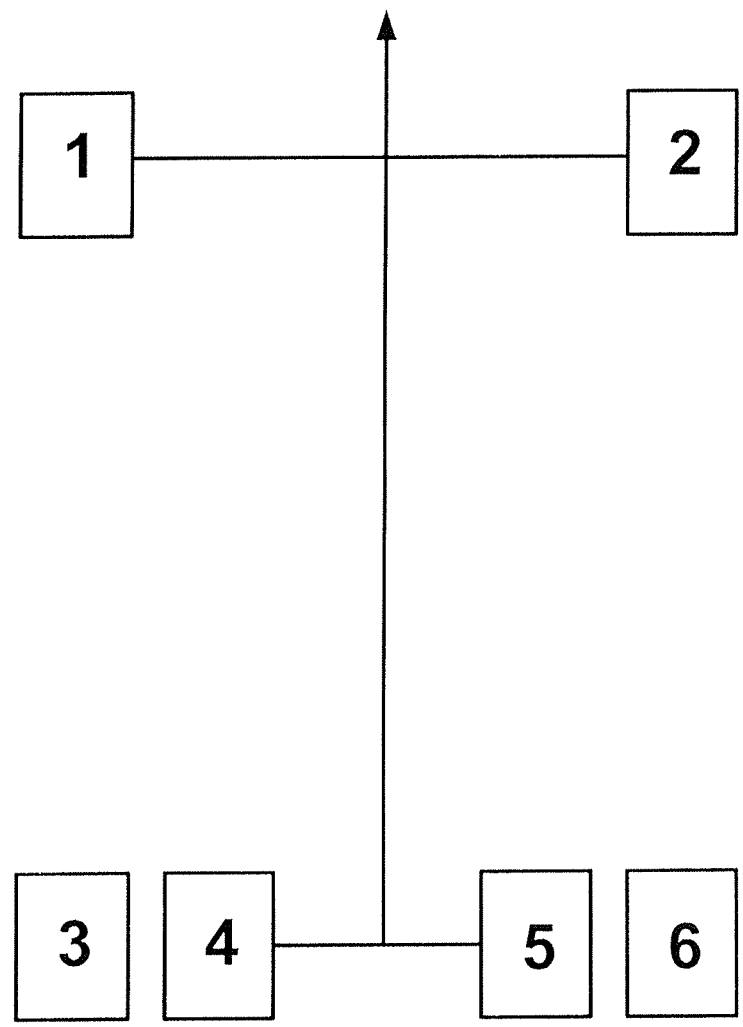
FIG. 7 illustrates a relationship between wheel positions and position numbers in the first embodiment.

Actual measurement data related to the process of associating the tire condition measuring devices 10A to 10F with the wheel installation positions will now be presented. FIG. 6 shows average values (dBm) of received signal strength levels (RSSI: received signal strength indication) of radio signals received from the tire condition measuring devices 10A to 10F of the wheels 2A to 2F and maximum values (° C.) of internal air temperatures of the tires installed on each of the wheels 2A to 2F as measured by the main apparatus 30A. The values are associated with the wheel position numbers shown in FIG. 7. As shown in FIG. 7, the wheel installation numbers are defined such that number 1 is the front left wheel, number 2 is the front right wheel, number 3 is the outside wheel of the rear left dual wheel, number 4 is inside wheel of the rear left dual wheel, number 5 is the inside wheel of the rear right dual wheel, number 6 is the outside wheel of the rear right dual wheel.

An example of measured average values (dBm) of received signal strength levels (RSSI) of radio signals received from the tire condition measuring devices 10A to 10F of the wheels 2A to 2F is as follows in order from the wheel installation position 1 to the wheel installation position 6: −56.5 dBm, −61.3 dBm, −62.4 dBm, −63.2 dBm, −64.7 dBm, and 64.2 dBm. Meanwhile, an example of maximum values (° C.) of internal air temperatures of the tires installed on the wheels 2A to 2F is as follows in order from the wheel installation position 1 to the wheel installation position 6: 38° C., 36° C., 35° C., 41° C., 39° C., and 35° C.

Figure 8:
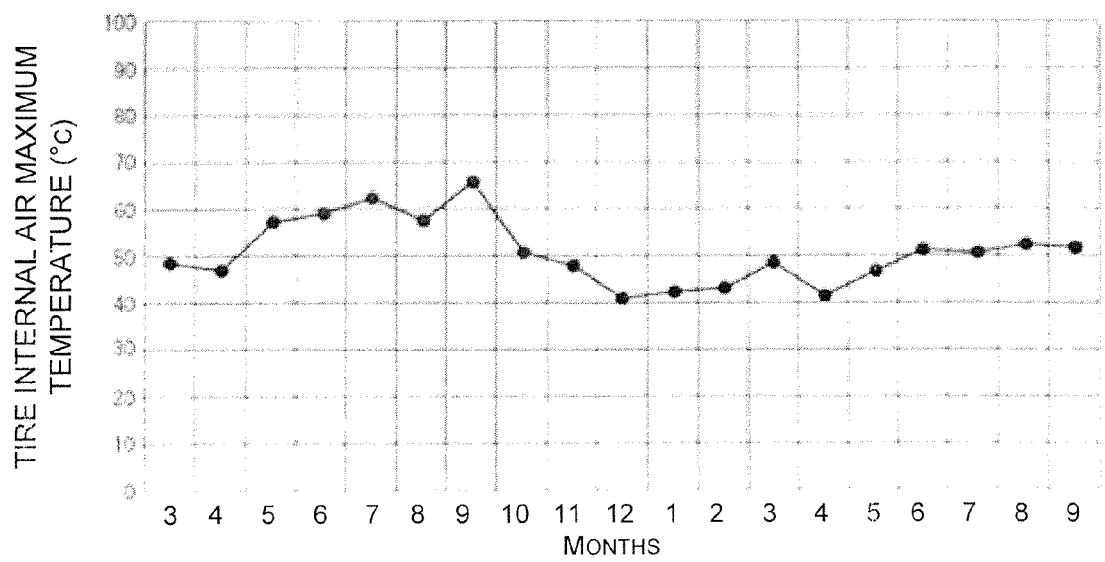
FIG. 8 shows a tire temperature of a front left tire of a six-wheeled vehicle according to the first embodiment.

FIGS. 8 to 13 indicate examples of measured values of temperatures of the tires installed on the wheels 2A to 2F. These values are actual measured values measured from March 2006 to September 2007. FIG. 8 indicates tire internal air temperatures of a tire located at the number 1 wheel installation position, FIG. 9 indicates tire internal air temperatures of a tire located at the number 2 wheel installation position and FIG. 10 indicates tire internal air temperatures of a tire located at the number 3 wheel installation position. Also, FIG. 11 indicates tire internal air temperatures of a tire located at the number 4 wheel installation position, FIG. 12 indicates tire internal air temperatures of a tire located at the number 5 wheel installation position, and FIG. 13 indicates tire internal air temperatures of a tire located at the number 6 wheel installation position.

Figure 9:
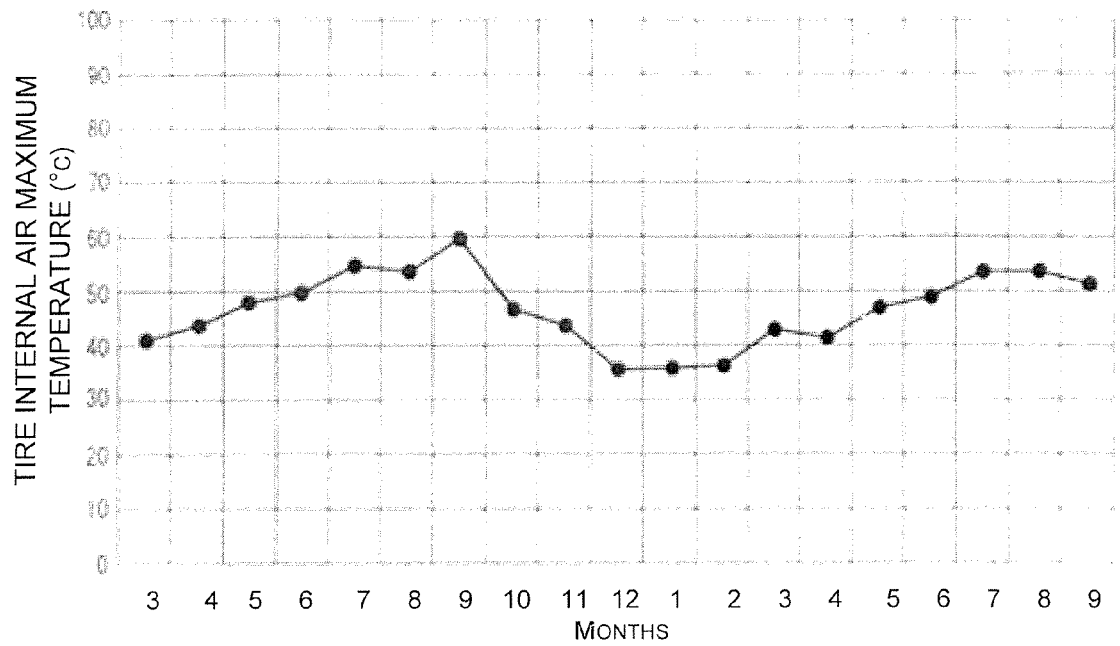
FIG. 9 shows a tire temperature of a front right tire of the six-wheeled vehicle according to the first embodiment.

As shown in FIG. 8, the internal air temperatures measured for the tire installed on the wheel 2A in the number 1 wheel installation position from March 2006 to September 2007 were as follows in chronological order: 48° C., 46° C., 57° C., 59° C., 62° C., 57° C., 66° C., 50° C., 48° C., 41° C., 42° C., 42° C., 48° C., 41° C., 47° C., 51° C., 50° C., 52° C., and 51° C. As shown in FIG. 9, the internal air temperatures measured for the tire installed on the wheel 2B in the number 2 wheel installation position from March 2006 to September 2007 were as follows in chronological order: 41° C., 43° C., 48° C., 50° C., 55° C., 53° C., 59° C., 47° C., 43° C., 36° C., 36° C., 36° C., 42° C., 41° C., 47° C., 49° C., 53° C., 53° C., and 51° C.

Figure 10:
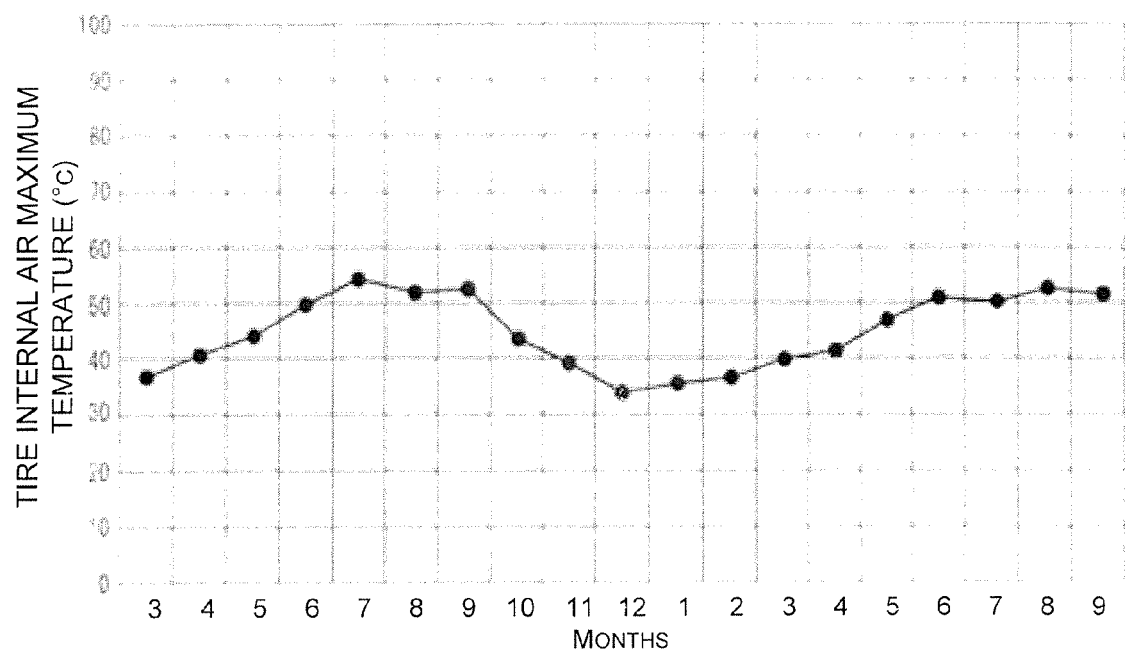
FIG. 10 shows a tire temperature of a rear left outside tire of the six-wheeled vehicle according to the first embodiment.

As shown in FIG. 10, the internal air temperatures measured for the tire installed on the wheel 2C in the number 3 wheel installation position from March 2006 to September 2007 were as follows in chronological order: 37° C., 41° C., 43° C., 50° C., 54° C., 52° C., 52° C., 43° C., 40° C., 34° C., 36° C., 37° C., 40° C., 42° C., 47° C., 51° C., 50° C., 52° C., and 51° C.

Figure 11:
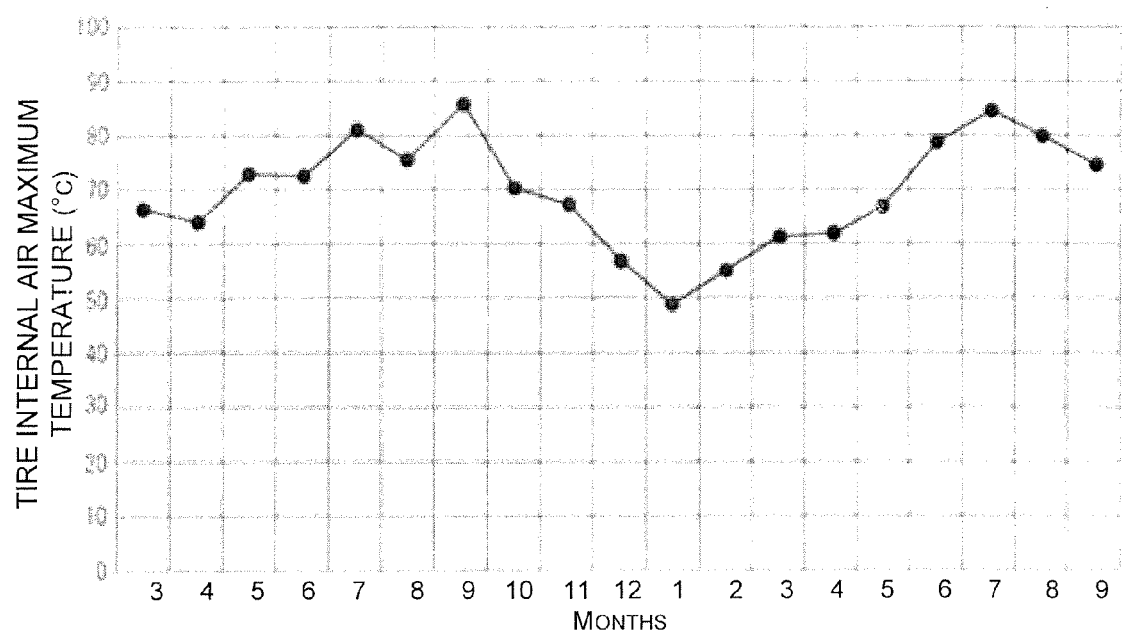
FIG. 11 shows a tire temperature of a rear left inside tire of the six-wheeled vehicle according to the first embodiment.

As shown in FIG. 11, the internal air temperatures measured for the tire installed on the wheel 2D in the number 4 wheel installation position from March 2006 to September 2007 were as follows in chronological order: 67° C., 63° C., 72° C., 72° C., 81° C., 76° C., 86° C., 70° C., 68° C., 57° C., 49° C., 56° C., 61° C., 61° C., 67° C., 79° C., 84° C., 80° C., and 74° C.

Figure 12:
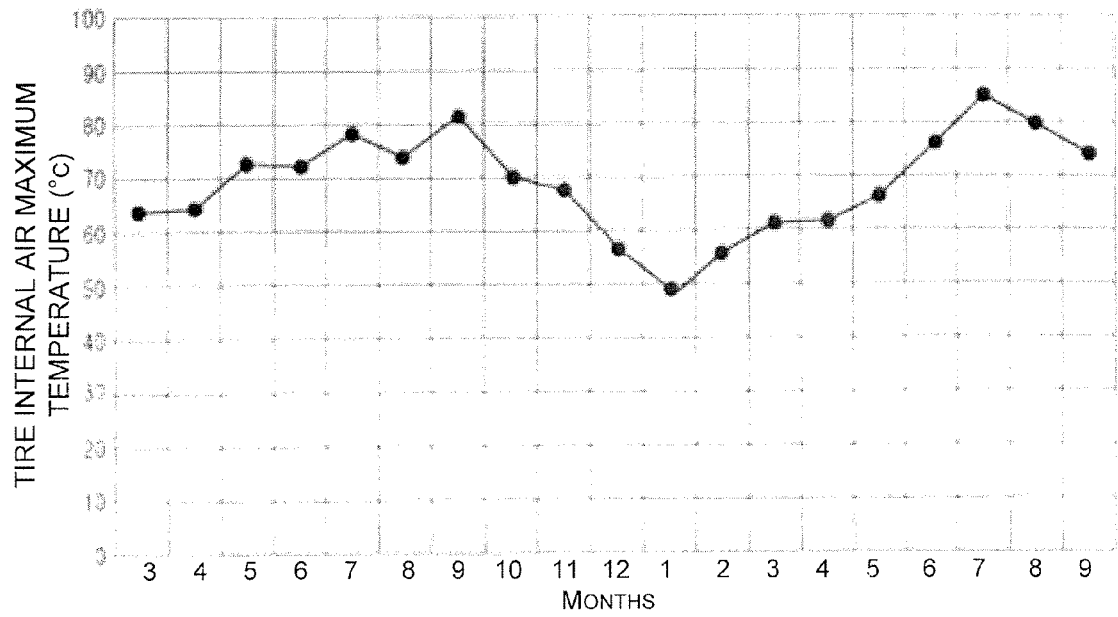
FIG. 12 shows a tire temperature of a rear right inside tire of the six-wheeled vehicle according to the first embodiment.

As shown in FIG. 12, the internal air temperatures measured for the tire installed on the wheel 2E in the number 5 wheel installation position from March 2006 to September 2007 were as follows in chronological order: 63° C., 64° C., 72° C., 72° C., 78° C., 74° C., 81° C. 70° C., 68° C., 57° C., 49° C., 57° C., 61° C., 61° C., 67° C., 76° C., 85° C., 80° C., and 74° C.

Figure 13:
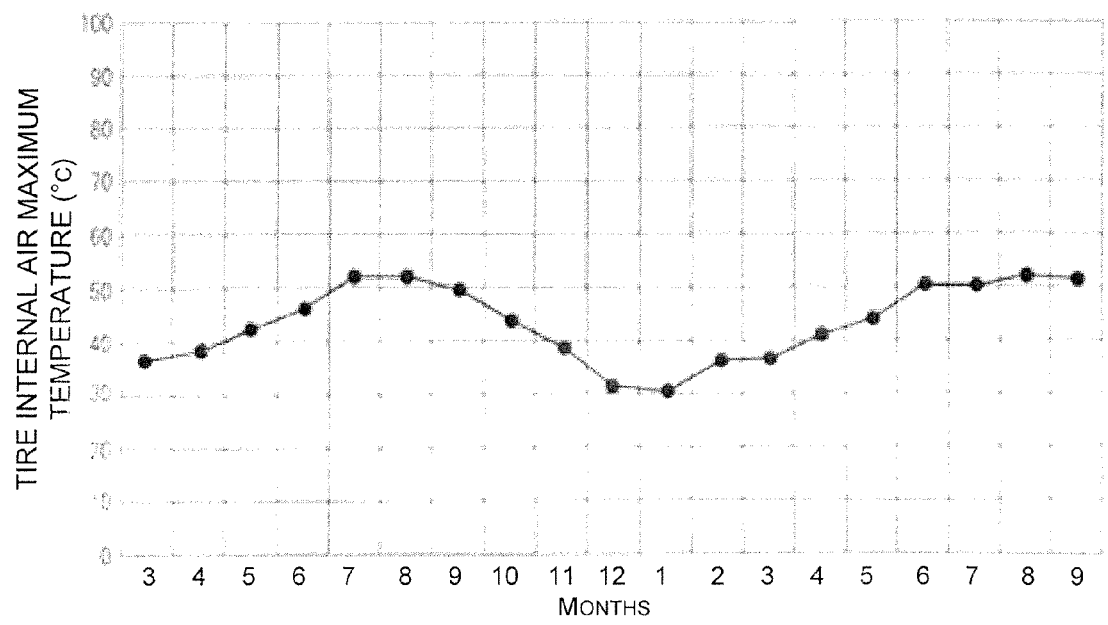
FIG. 13 shows a tire temperature of a rear right outside tire of the six-wheeled vehicle according to the first embodiment.

As shown in FIG. 13, the internal air temperatures measured for the tire installed on the wheel 2F in the number 6 wheel installation position from March 2006 to September 2007 were as follows in chronological order: 37° C., 39° C., 42° C., 47° C., 52° C., 52° C., 50° C., 44° C., 39° C., 31° C., 30° C., 37° C., 37° C., 41° C., 44° C., 50° C., 50° C., 52° C., and 51° C.

As indicated, the internal air temperatures of the tires installed on the inside wheels 2D and 2E of the dual wheels reach much higher temperatures than the internal air temperatures of the tires installed in other positions. Thus, a tire internal temperature of an inside wheel of a dual wheel can be specified as a tire internal temperature of an inside wheel based on the internal air temperature of the tire.

Figure 14:
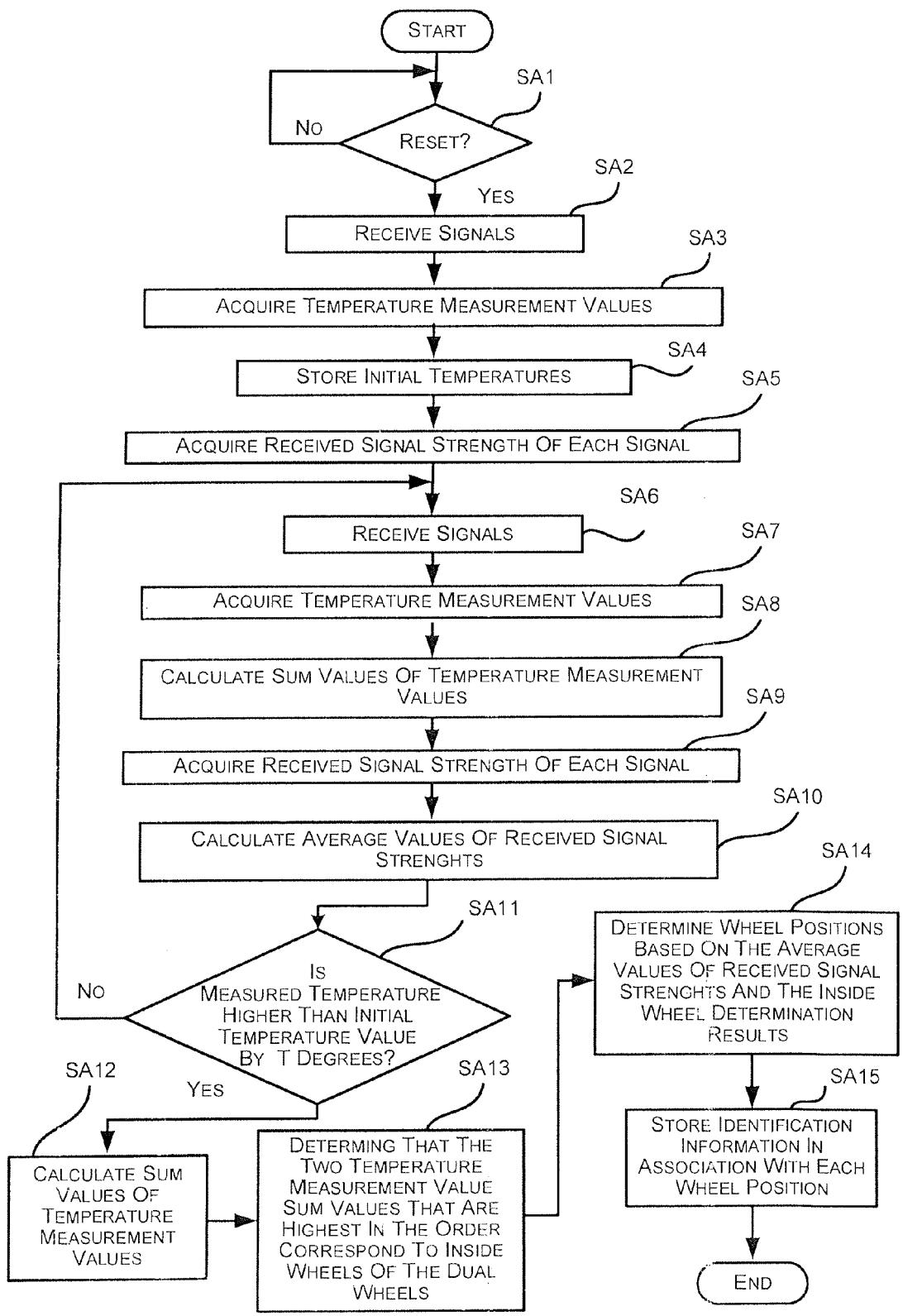
FIG. 14 is a flowchart explaining a wheel position determining process according to the first embodiment.

The aforementioned process for associating each of the tire condition measuring devices 10A to 10F with one of the wheel installation positions will now be explained in detail with reference to the flowchart shown in FIG. 14. When a system user has changed a tire or performed a tire rotation (rearrangement of the tire positions), the user resets the system by pressing the reset switch on the switch panel 34 of the main apparatus 30A. As a result, the main apparatus 30A executes a process in which it automatically associates the identification information of the tire condition measuring device 10A to 10F installed in the tire of each of the wheels 2A to 2F with one of the wheel installation positions.

Thus, after the reset switch has been pressed and the system has been reset (SA1), the CPU 321 of the main apparatus 30A receives signals transmitted from the tire condition measuring devices 10A to 10F through the antenna AT1 (SA2), acquires internal air temperature measurement values of the tires from the received signals (SA3), and stores the temperature measurement values in the storage section 322 as initial temperature values associated with the identification information of each of the tire condition measuring devices 10A to 10F, respectively, extracted from the received signals. The CPU 321 also acquires a received signal strength for each of the received signals and stores the received signal strengths in the storage section 322 in association with the identification information of each of the tire condition measuring devices 10A to 10F (SA5).

Next, the CPU 321 of the main apparatus 30A receives signals from the tire condition measuring devices 10A to 10F through the antenna AT1 (SA6), acquires temperature measure values of the air inside the tires from the received signals (SA7), and calculates a sum value of temperature measurement values corresponding to the identification information of each of the tire condition measuring devices 10A to 10F (SA8). In this embodiment, the temperature measurement values are added sequentially with respect to the identification information of each of the tire condition measuring devices 10A to 10F and the values resulting from the addition operations are stored in the storage section 322 in association with the identification information of the respective tire condition measuring devices 10A to 10F.

The CPU 321 also acquires received signal strengths for each of the received signals (SA9). The CPU 321 then calculates new average values of the received signal strengths based on the received signal strength, a sum value of the received signal strengths stored in the storage section 322, and the number of signal receptions, stores the newly calculated average values in the storage section 322 as new average values associated with the identification information of each of the tire condition measuring devices 10A to 10F, and updates the sum value of received signal strengths and the number of signal receptions stored in the storage section 322 in association with the identification information of each of the tire condition measuring devices 10A to 10F (SA10).

With respect to the identification information of each of the tire condition measuring devices 10A to 10F, the CPU 321 then compares the temperature measurement value acquired from the received signal to the initial temperature value stored in the storage section 322 and determines if the measured temperature value associated with the respective identification information is larger than the corresponding initial temperature value by an amount equal to or larger than T degrees (SA11). In the present invention, the value of T is set to 20° C.

This value is set based on the fact that the temperature of the air inside a tire installed on an inside wheel of a dual wheel rises above an ambient temperature by 20 degrees Celsius (C) or more during all seasons.

If the result of SA11 is that the measured temperature value is not higher than the initial temperature value by an amount equal to or larger than T degrees, then the CPU 321 proceeds to the aforementioned step SA6. If the measured temperature value is higher than the initial temperature value by an amount equal to or larger than T degrees, then the CPU 321 arranges the sum values of the measured temperatures in order from highest to lowest (SA12) and determines that the two sum values (where "two" corresponds to the number of dual wheels) in the order are sum values of the internal air temperatures of the tires installed on the inside wheels 2D and 2E of the dual wheels, thereby ascertaining the identification information corresponding to those two wheels (SA13).

Next, the CPU 321 determines the wheel position corresponding to each identification information based on the average values of the received signal strengths and the results of the determination of the inside wheels of the dual wheels executed in SA13 (SA14). Then, the CPU 321 stores the wheel positions and the identification information of each of the tire condition measuring devices 10A to 10F in the storage section 322 such that each of the wheel positions is associated with the corresponding identification information (SA15) and ends the process of associating the wheel installation positions with the tire condition measuring devices 10A to 10F.

Figure 1:
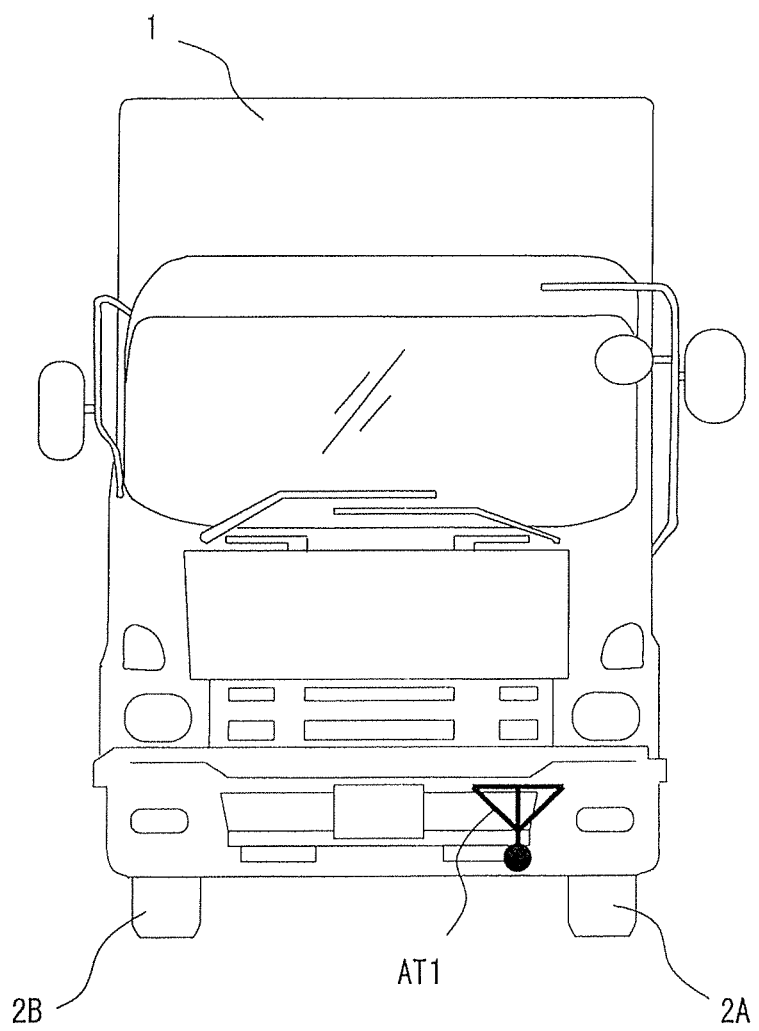
FIG. 1 is a frontal view of a vehicle according to a first disclosed embodiment.
Figure 2:
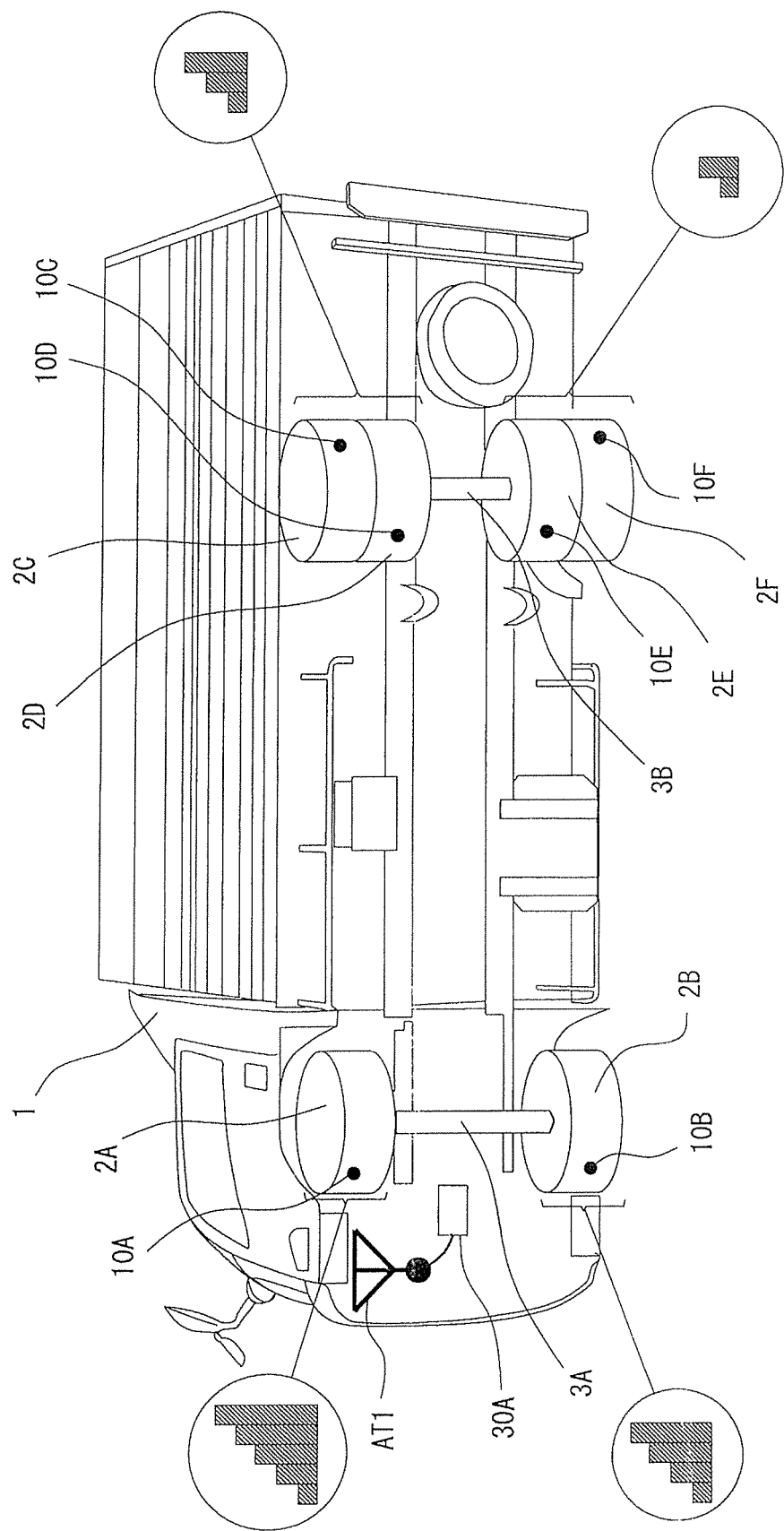
FIG. 2 is a perspective view of a wheel arrangement according to the first embodiment.
Figure 3:
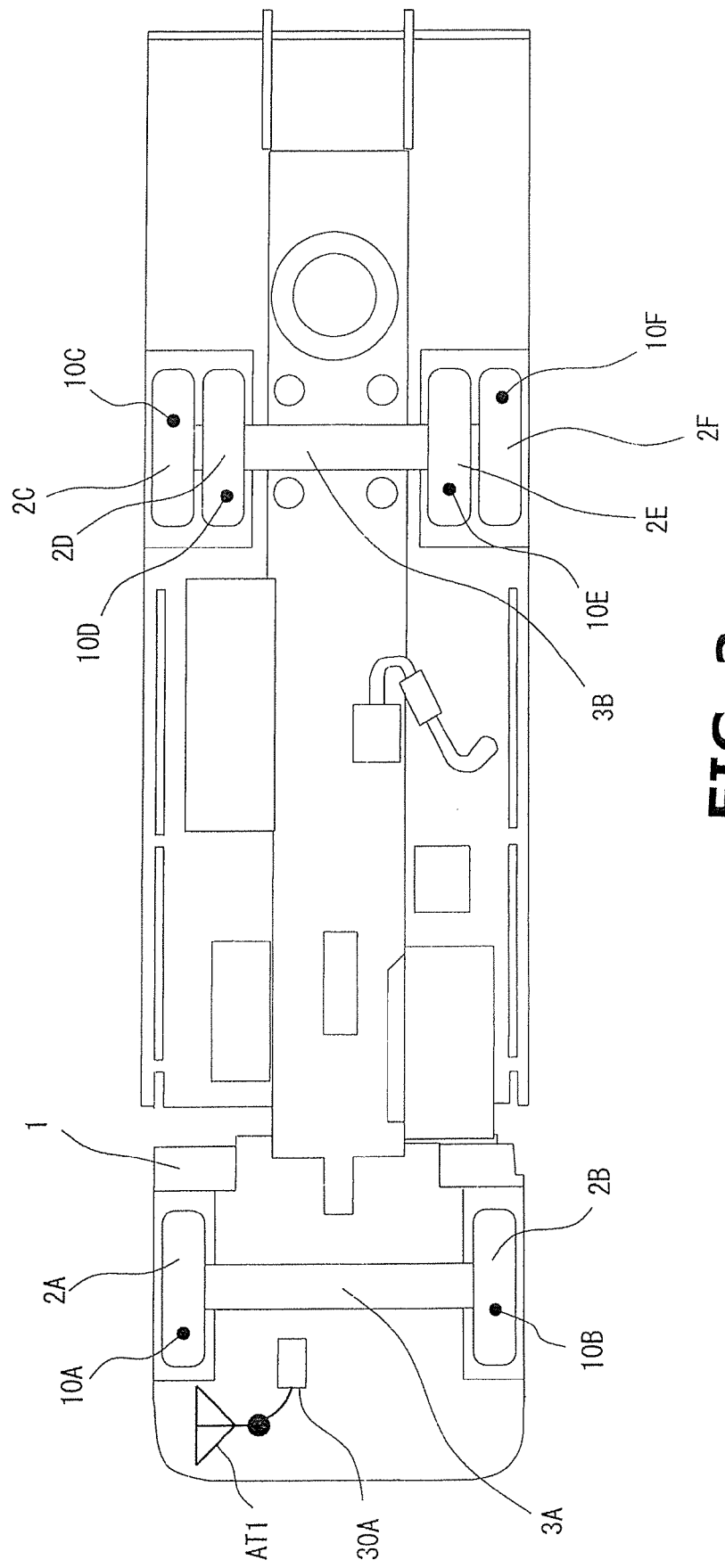
FIG. 3 is a bottom plan view of a wheel arrangement according to the first embodiment.

In FIG. 2, the average value of a received signal strength received by the main apparatus 30A through the antenna AT1 is expressed in terms of five levels. The closer a wheel is to the antenna AT1, the higher the average value of the received signal strength received by the main apparatus 30A will be with respect to a radio signal transmitted from a tire condition measuring device installed on the same wheel. In the example shown in FIG. 2, the left front wheel 2A is the wheel closest to the antenna AT1 and the radio signal transmitted by the tire condition measuring device 10A installed on the wheel 2A has a level 5 average received signal strength, which is the highest level. The right front wheel 2B is the wheel second closest to the antenna AT1 and the radio signal transmitted by the tire condition measuring device 10B installed on the wheel 2B has a level 4 average received signal strength, which is the second highest level. Meanwhile, the wheels 2C and 2D of the rear left dual wheel are the wheels third closest to the antenna AT1 and the radio signals transmitted by the tire condition measuring devices 10C and 10D installed on the wheels 2C and 2D have level 3 average received signal strengths, which is the third highest level. Likewise, the wheels 2E and 2F of the rear right dual wheel are the wheels farthest from the antenna AT1 and the radio signals transmitted by the tire condition measuring devices 10E and 10F installed on the wheels 2E and 2F have level 2 average received signal strengths, which is lowest of the received levels.

Which wheels of the dual wheels are inside wheels and which are outside wheels can be determined based on the internal air temperatures of the tires, and the respective wheel installation positions of the tires, i.e., the dual-wheel inside wheels, on which the tire condition measuring devices 10D and 10E are attached can be determined based on the average values of the received signal strengths of the radio signals transmitted from the tire condition measuring devices 10D and 10E. The reason average values of the received signal strengths are used in this embodiment is that the received signal strength changes drastically depending on ambient conditions of the vehicle. For example, if another vehicle, a guard rail, or other object that reflects radio waves exists alongside the vehicle, then the reflection will cause the received signal strengths to change and the relative strength or weakness of the received signal strengths will change. By using average values of the received signal strengths, the effects of such changes can be greatly reduced.

Also, in this embodiment, the temperature measurement values acquired from the signals received from the tire condition measuring devices 10A to 10F are summed sequentially in association with the identification information of each of the tire condition measuring devices 10A to 10F and the sum values are arranged in order from highest to lowest. The sum values highest in the order are then determined to be sum values of the temperature measurement values of the tires installed on the inside wheels of the dual wheels. However, it is acceptable to find average values instead of sum values of the temperature measurement values, arrange the average values in order, and determine that the average values highest in the order, i.e., the largest average values, correspond to the temperature measurement values of the tires installed on the inside wheels of the dual wheels. It is also acceptable to calculate differences between the initial temperature measurement values stored in the storage section and the temperature measurement values acquired from the received signals, i.e., calculate difference values by subtracting the initial temperature values from the temperature measurement values acquired from the received signals, and determine that the difference values that are highest in the order when the difference values are arranged from largest to smallest, i.e., determine that the largest difference values, correspond to the temperature measurement values of the tires installed on the inside wheels of the dual wheels.

Figure 15:
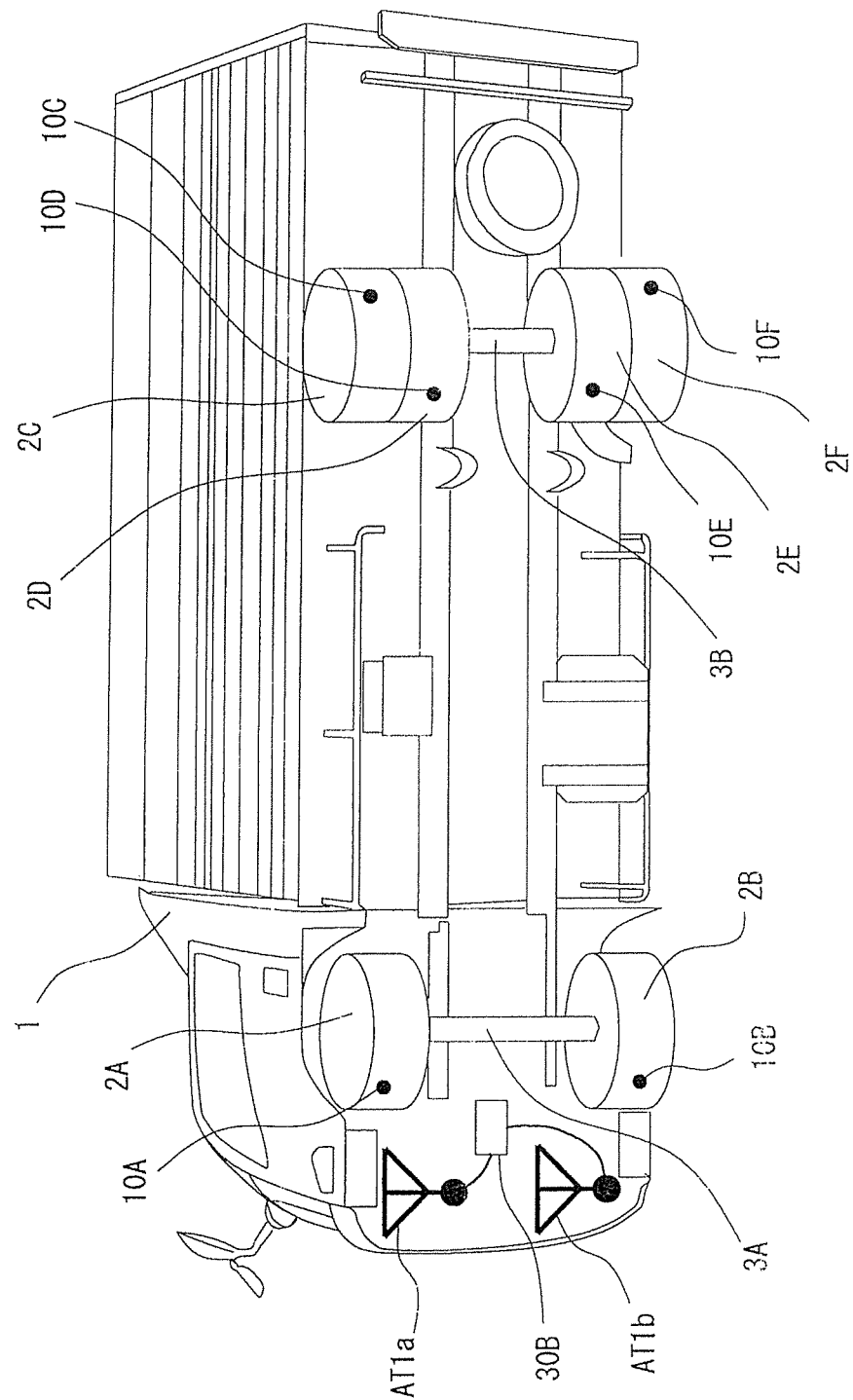
FIG. 15 is a perspective view of a wheel arrangement in a second disclosed embodiment.
Figure 16:
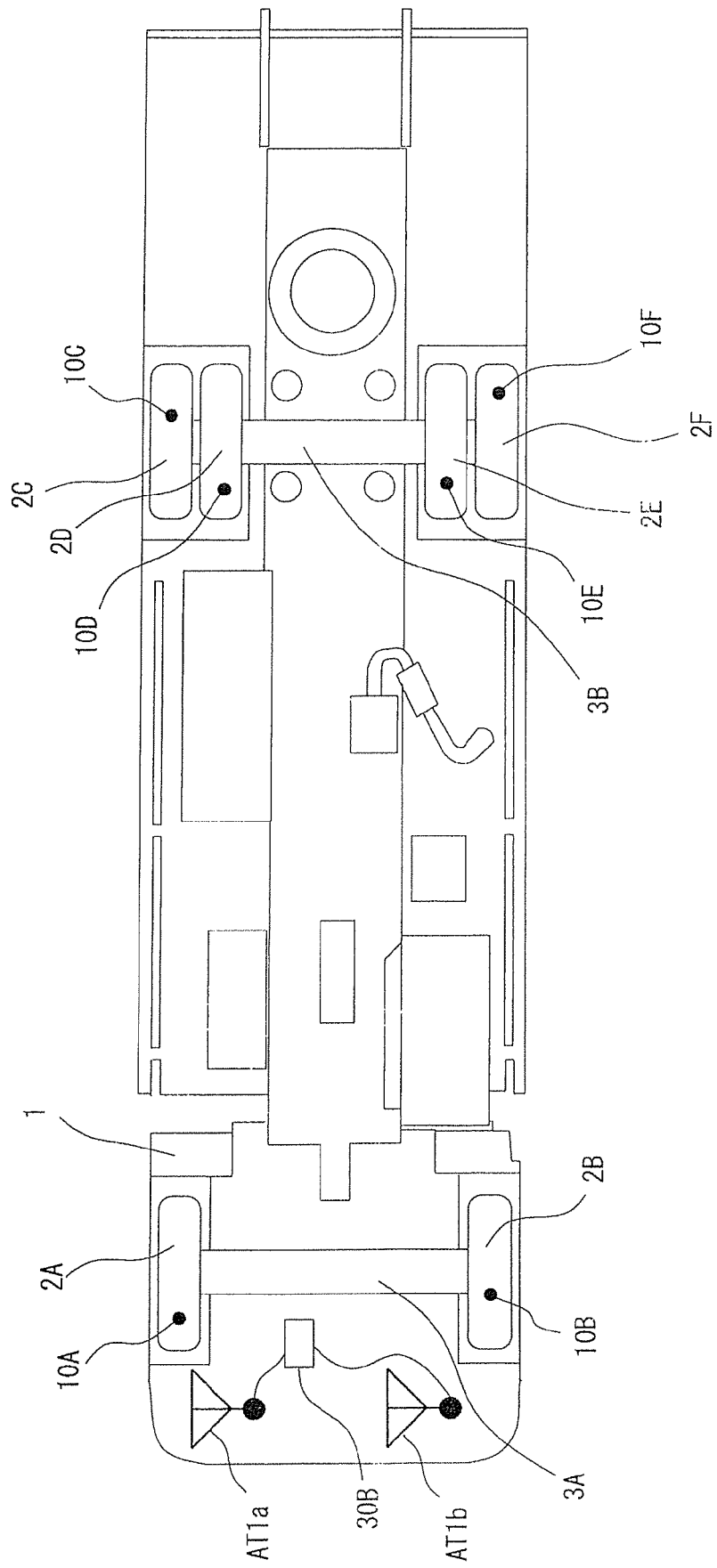
FIG. 16 is a bottom plan view of a vehicle showing the wheel arrangement in the second embodiment.
Figure 17:
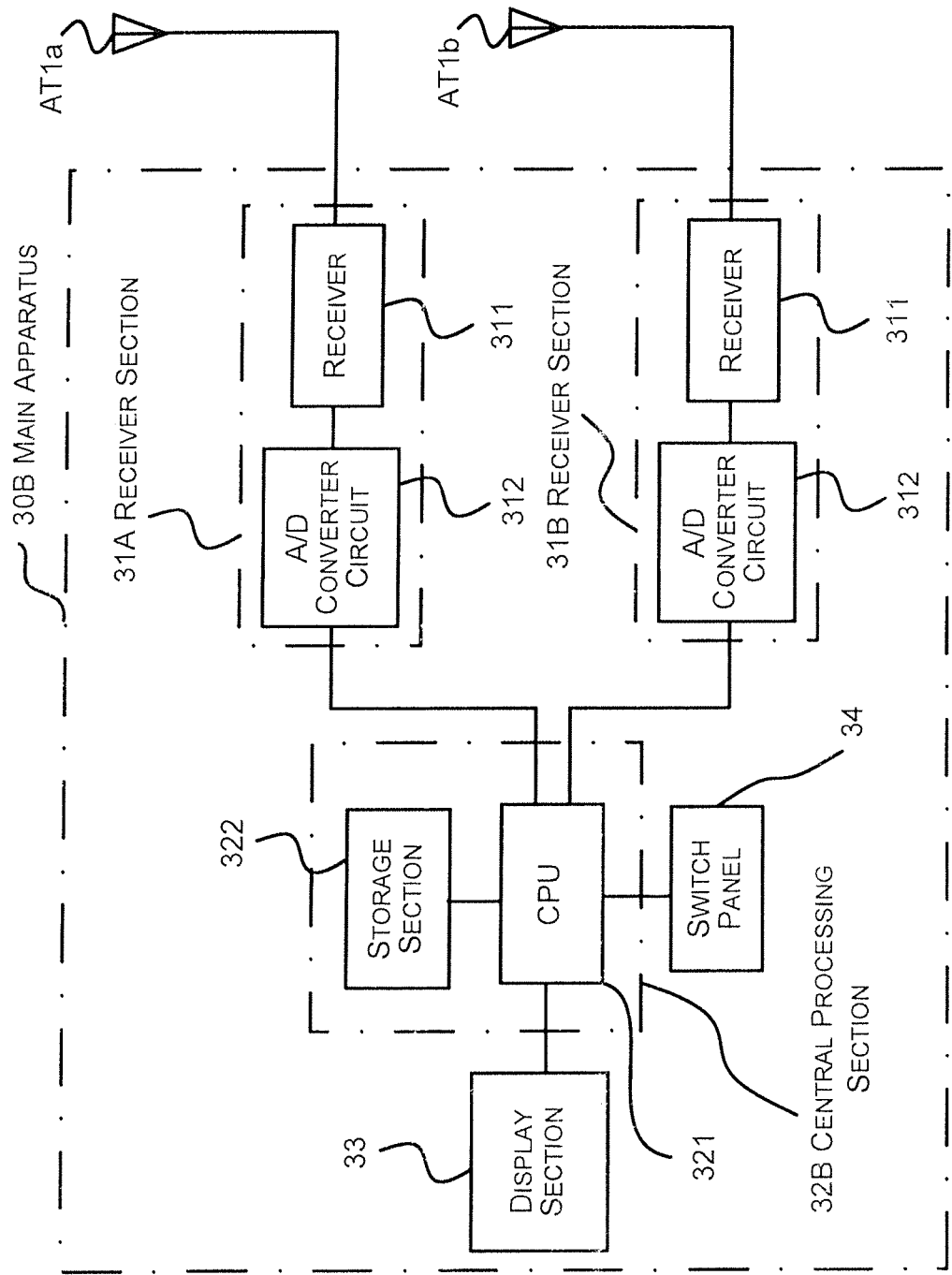
FIG. 17 is a block diagram showing an electric circuit of a main apparatus according to the second embodiment.

A second disclosed embodiment will now be explained. In FIGS. 15 through 17, parts that are the same as the parts of the first embodiment are indicated using the same reference numerals.

In the second embodiment, similarly to the first embodiment, a vehicle 1 has one front wheel axle shaft and one rear wheel axle shaft. One wheel 2A or 2B is provided on each end of the front wheel axle shaft 3A, and two wheels 2C to 2F are provided on each end of the rear wheel axle shaft 3B. The vehicle 1 has a tire condition monitoring system. A method by which the system ascertains a wheel mounting position will be explained. The wheels 2C and 2D arranged adjacently on a left end of the rear wheel axle shaft 3B constitute a dual wheel, and the wheels 2E and 2F arranged adjacently on a right end of the rear axle shaft 3B constitute a dual wheel. The wheels 2D and 2E are inside wheels of the dual wheels, and the wheels 2C and 2F are outside wheels of the dual wheels.

One difference between the second embodiment and the first embodiment is that the second embodiment is provided with two antennas AT1a and AT1b that are connected to a main apparatus 30B and arranged nearby and frontward of the two front wheels 2A and 2B, respectively. One of the antennas AT1a is arranged nearby and frontward of the left front wheel 2A, and the other antenna AT1b is arranged nearby and frontward of the right front wheel 2B.

As shown in FIG. 17, the main apparatus 30B of the second embodiment comprises receiver sections 31A and 31B, a central processing section 32B, a display section 33, and a switch panel 34 and these components are driven by electric power supplied from a battery of the vehicle. The receiver section 31A comprises a receiver 311 and an A/D converter circuit 312. An input side of the receiver 311 is connected to the antenna AT1a. After a high-frequency electromagnetic signal having a frequency f1 has been received from the tire condition measuring devices 10A to 10F and inspected, the electromagnetic signal is outputted to the central processing section 32B through the A/D converter circuit 312. The receiver section 31A also outputs a strength value of the received signal to the central processing section 32B as information indicating a received signal strength.

The receiver section 31B comprises a receiver 311 and an A/D converter circuit 312. An input side of the receiver 311 is connected to the antenna AT1b. After a high-frequency electromagnetic signal having a frequency f1 has been received from the tire condition measuring devices 10A to 10F and inspected, the electromagnetic signal is outputted to the central processing section 32B through the A/D converter circuit 312. The receiver section 31B also outputs a strength value of the received signal to the central processing section 32B as information indicating a received signal strength.

The central processing section 32B comprises a well-known CPU 321 and memory section 322 and serves to execute computer processing of sensor detection information received from the tire condition measuring devices 10A to 10F to obtain tire air pressure information and tire temperature information and display the obtained information on the display section 33. The central processing section 32B displays the information based on identification information of the tire condition measuring devices 10A to 10F. The identification information of each of the tire condition measuring devices 10A to 10F is associated with one of the wheel installation positions stored in the storage section 322. After a reset switch on the switch panel 34 is pressed and the system has been reset, the central processing section 32B automatically executes a process of associating the tire condition measuring devices 10A to 10F installed in the tires of the wheels 2A to 2F with the wheel installation positions. This association processing will be explained in more detail later.

The storage section 322 comprises a ROM in which a program executed by the CPU 321 is stored and a non-volatile semiconductor memory that is electrically rewritable, e.g., an EEPROM (electrically erasable programmable read-only memory). Such information as a number of wheels, a number of dual wheels, and positional relationships among the installation positions of the wheels 2A to 2F and the antennas AT1a and AT1b are received from an external source and stored in advance in a region designated as rewritable inside the storage section 322 when the main apparatus 30B is installed in the vehicle.

The display section 33 serves to display sensor detection information that the CPU 321 receives from each of the tire condition measuring devices 10A to 10F. Similar to the first embodiment, the display section 33 comprises a display panel (not shown) and serves to display a variety of information.

Figure 18:
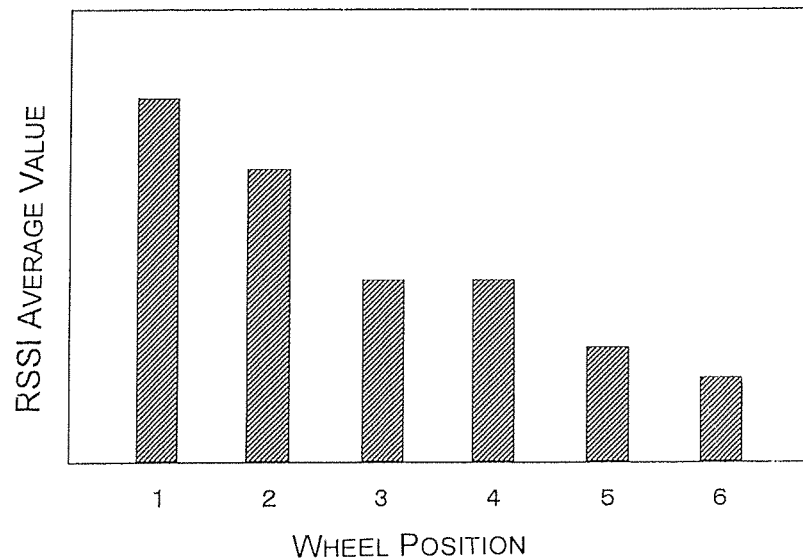
FIG. 18 is a chart illustrating average received signal strength values of signals received by an antenna AT1$a$ from each wheel position in the second embodiment.
Figure 19:
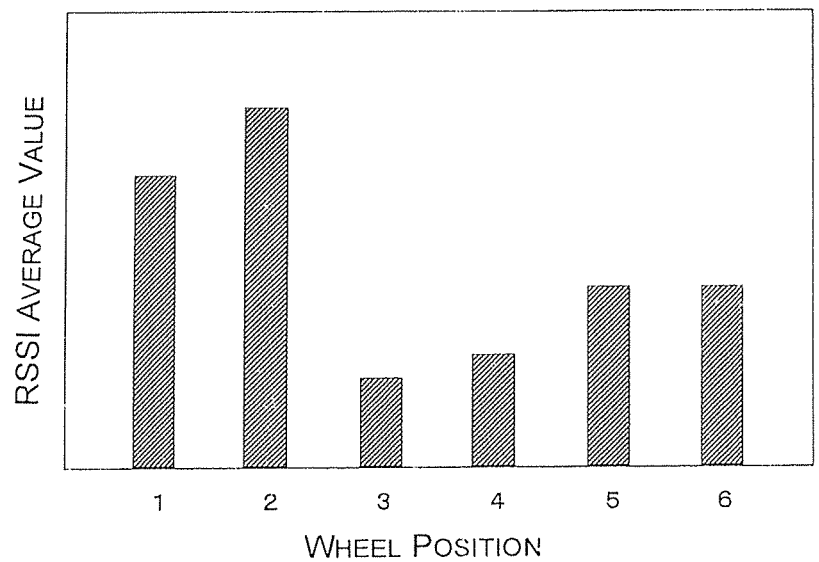
FIG. 19 is a chart showing average received signal strength values of signals received by an antenna AT1$b$ from each wheel position in the second embodiment.

Actual measurement data related to the process of associating the tire condition measuring devices 10A to 10F with the wheel installation positions are presented in FIGS. 18 and 19. FIG. 18 is a chart illustrating average received signal strength values of signals received by the main apparatus 30B through the antenna AT1a (which is mounted on a left frontward portion of the vehicle 1) from the tire condition measuring device 10A to 10F installed at each of the wheel positions, and FIG. 19 is a chart showing average received signal strength values of signals received by the main apparatus 30B through the antenna AT1b (which is mounted on a right frontward portion of the vehicle 1) from the tire condition measuring device 10A to 10F installed at each of the wheel positions.

As shown in FIG. 18, among the radio signals received by the antenna AT1a, the radio signal received from the tire condition measuring device 10A installed on the wheel 2A located at the number 1 wheel installation position has the largest average received signal strength. Meanwhile, the radio signal received from the tire condition measuring device 10B installed on the wheel 2B located at the number 2 wheel installation position has the second largest average received signal strength, the radio signals received from the tire condition measuring devices 10C and 10D installed on the wheels 2C and 2D located at the number 3 and 4 wheel installation positions have the third largest average received signal strengths, the radio signal received from the tire condition measuring device 10E installed on the wheel 2E located at the number 5 wheel installation position has the fourth largest average received signal strength, and the radio signal received from the tire condition measuring device 10F installed on the wheel 2F located at the number 6 wheel installation position has the fifth largest average received signal strength.

As shown in FIG. 19, among the radio signals received by the antenna AT1b, the radio signal received from the tire condition measuring device 10B installed on the wheel 2B located at the number 2 wheel installation position has the largest average received signal strength. Meanwhile, the radio signal received from the tire condition measuring device 10A installed on the wheel 2A located at the number 1 wheel installation position has the second largest average received signal strength, the radio signals received from the tire condition measuring devices 10E and 10F installed on the wheels 2E and 2F located at the number 5 and 6 wheel installation positions have the third largest average received signal strengths, the radio signal received from the tire condition measuring device 10D installed on the wheel 2D located at the number 4 wheel installation position has the fourth largest average received signal strength, and the radio signal received from the tire condition measuring device 10C installed on the wheel 2C located at the number 3 wheel installation position has the fifth largest average received signal strength.

Figure 20:
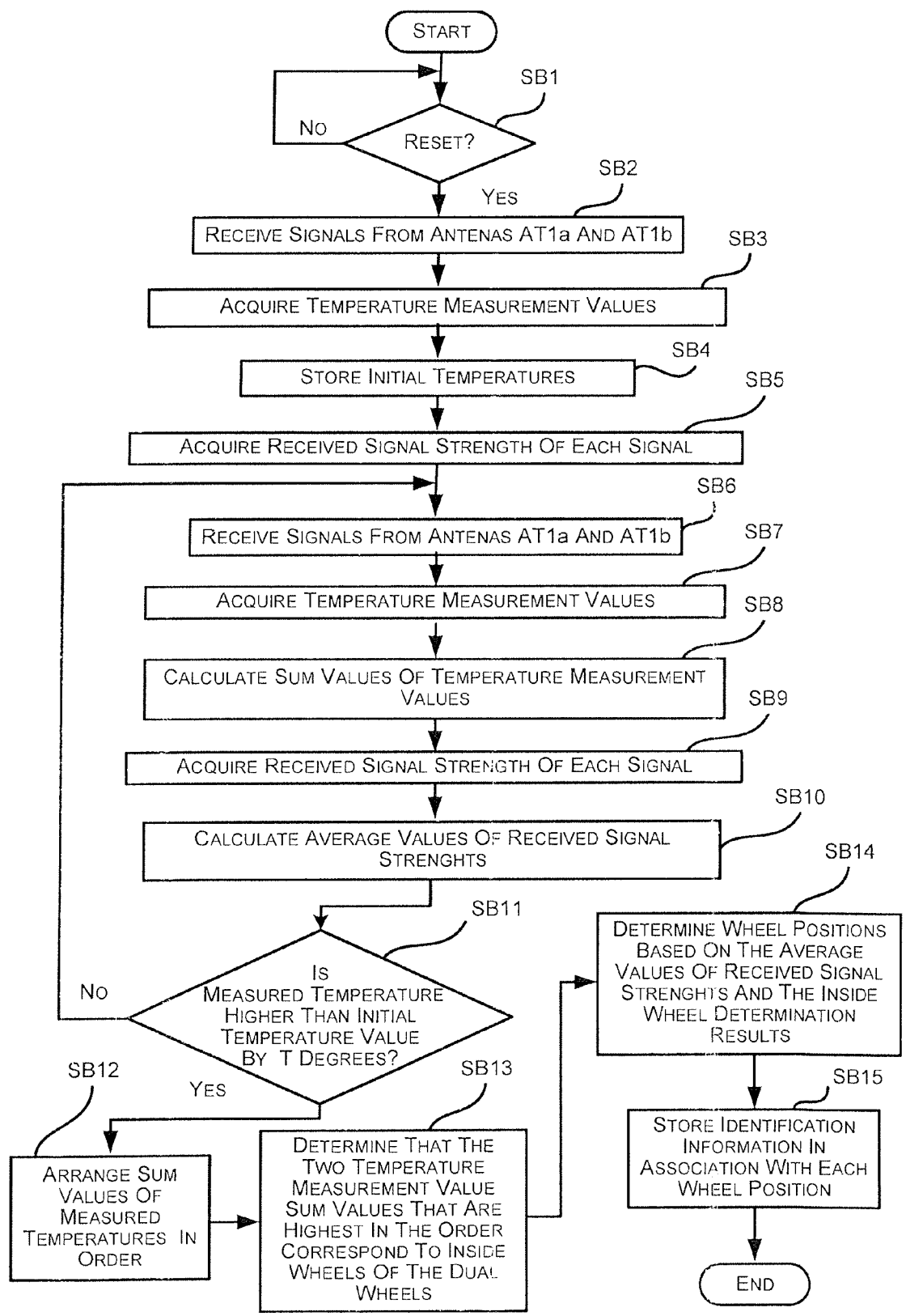
FIG. 20 is a flowchart explaining a wheel position determining process according to the second embodiment.

The process by which the main apparatus 30B according to the second embodiment associates each of the tire condition measuring devices 10A to 10F with one of the wheel installation positions will now be explained in detail with reference to the flowchart shown in FIG. 20. When a system user has changed a tire or performed a tire rotation (rearrangement of the tire positions), the user resets the system by pushing the reset switch on the switch panel 34 of the main apparatus 30B. As a result, the main apparatus 30B executes a process in which it automatically associates the identification information of the tire condition measuring device 10A to 10F installed in the tire of each of the wheels 2A to 2F with one of the wheel installation positions. Thus, after the reset switch has been pressed and the system has been reset (SB1), the CPU 321 of the main apparatus 30B receives signals transmitted from the tire condition measuring devices 10A to 10F through the two antennas AT1a and AT1b (SB2), extracts internal air temperature measurement values of the tires from the received signals (SB3), and stores the temperature measurement values in the storage section 322 as initial temperature values associated with the identification information of each of the tire condition measuring devices 10A to 10F, respectively, extracted from the received signals.

The CPU 321 also acquires a received signal strength for each of the received signals and stores the received signal strengths in the storage section 322 in association with the identification information of each of the tire condition measuring devices 10A to 10F (SB5). Next, the CPU 321 of the main apparatus 30B receives signals from the tire condition measuring devices 10A to 10F through the two antennas AT1a and AT1b (SB6), acquires temperature measure values of the air inside the tires from the received signals (SB7), and calculates a sum of temperature measurement values associated with the identification information of each of the tire condition measuring devices 10A to 10F (SB8). In this embodiment, the temperature measurement values are added sequentially with respect to the identification information of each of the tire condition measuring devices 10A to 10F and the values resulting from the addition operations are stored in the storage section 322 in association with the identification information of the respective tire condition measuring devices 10A to 10F.

The CPU 321 also acquires received signal strengths for each of the received signals (SB9). The CPU 321 then calculates new average values of the received signal strengths based on the received signal strength value, a sum value of the received signal strengths stored in the storage section 322, and the number of signal receptions, stores the newly calculated average values in the storage section 322 as new average values associated with the identification information of each of the tire condition measuring devices 10A to 10F, and updates the sum value of received signal strengths and the number of signal receptions stored in the storage section 322 in association with the identification information of each of the tire condition measuring devices 10A to 10F (SB10).

With respect to the identification information of each of the tire condition measuring devices 10A to 10F, the CPU 321 then compares the temperature measurement value acquired from the received signal to the initial temperature value stored in the storage section 322 and determines if the measured temperature value associated with the respective identification information is larger than the corresponding initial temperature value by an amount equal to or larger than T degrees (SB11). Similarly to the first embodiment, the value of T is set to 20° C.

If the result of SB11 is that the measured temperature value is not higher than the initial temperature value by an amount equal to or larger than T degrees, then the CPU 321 proceeds to the aforementioned step SB6. If the measured temperature value is higher than the initial value by an amount equal to or larger than T degrees, then the CPU 321 arranges the sum values of the measured temperatures in order from high to low (SB12) and determines that the two sum values (where "two" corresponds to the number of dual wheels) highest in the order are sum values of the internal air temperatures of the tires installed on the inside wheels 2D and 2E of the dual wheels, thereby ascertaining the identification information corresponding to those two wheels (SB13).

Next, the CPU 321 determines the wheel position corresponding to each identification information based on the average values of the received signal strengths and the results of the determination of the inside wheels of the dual wheels executed in SB13 (SB14). Then, the CPU 321 stores the wheel positions and the identification information of each of the tire condition measuring devices 10A to 10F in the storage section 322 such that each of the wheel positions is associated with the corresponding identification information (SB15) and ends the process of associating the wheel installation positions with the tire condition measuring devices 10A to 10F.

Which wheels of the dual wheels are inside wheels and which are outside wheels can be determined based on the internal air temperatures of the tires, and the respective wheel installation positions of the tires; i.e., the dual-wheel inside wheels, on which the tire condition measuring devices 10D and 10E are installed can be determined based on the average values of the received signal strengths of the radio signals transmitted from the tire condition measuring devices 10D and 10E. In this embodiment, the accuracy is improved by receiving the signals using two antennas AT1a and AT1b. The reason for using average values of the received signal strengths is the same in this embodiment as explained previously regarding the first embodiment.

Also, in this embodiment, the temperature measurement values acquired from the signals received from the tire condition measuring devices 10A to 10F are summed sequentially in association with the identification information of each of the tire condition measuring devices 10A to 10F and the sum values are arranged in order from highest to lowest. The sum values highest in the order are then determined to be sum values of the temperature measurement values of the tires installed on the inside wheels of the dual wheels. However, it is also acceptable to find average values instead of sum values of the temperature measurement values, arrange the average values in order, and determine that the average values highest in the order, i.e., the largest average values, are average values of the temperature measurement values of the tires installed on the inside wheels of the dual wheels. It is also acceptable to calculate differences between the initial temperature measurement values stored in the storage section and the temperature measurement values acquired from the received signals, i.e., calculate difference values by subtracting the initial temperature values from the temperature measurement values acquired from the received signals, and determine that the difference values that are highest in the order when the difference values are arranged from largest to smallest, i.e., determine that the largest difference values, correspond to the temperature measurement values of the tires installed on the inside wheels of the dual wheels.

A third disclosed embodiment will now be explained.

Figure 21:
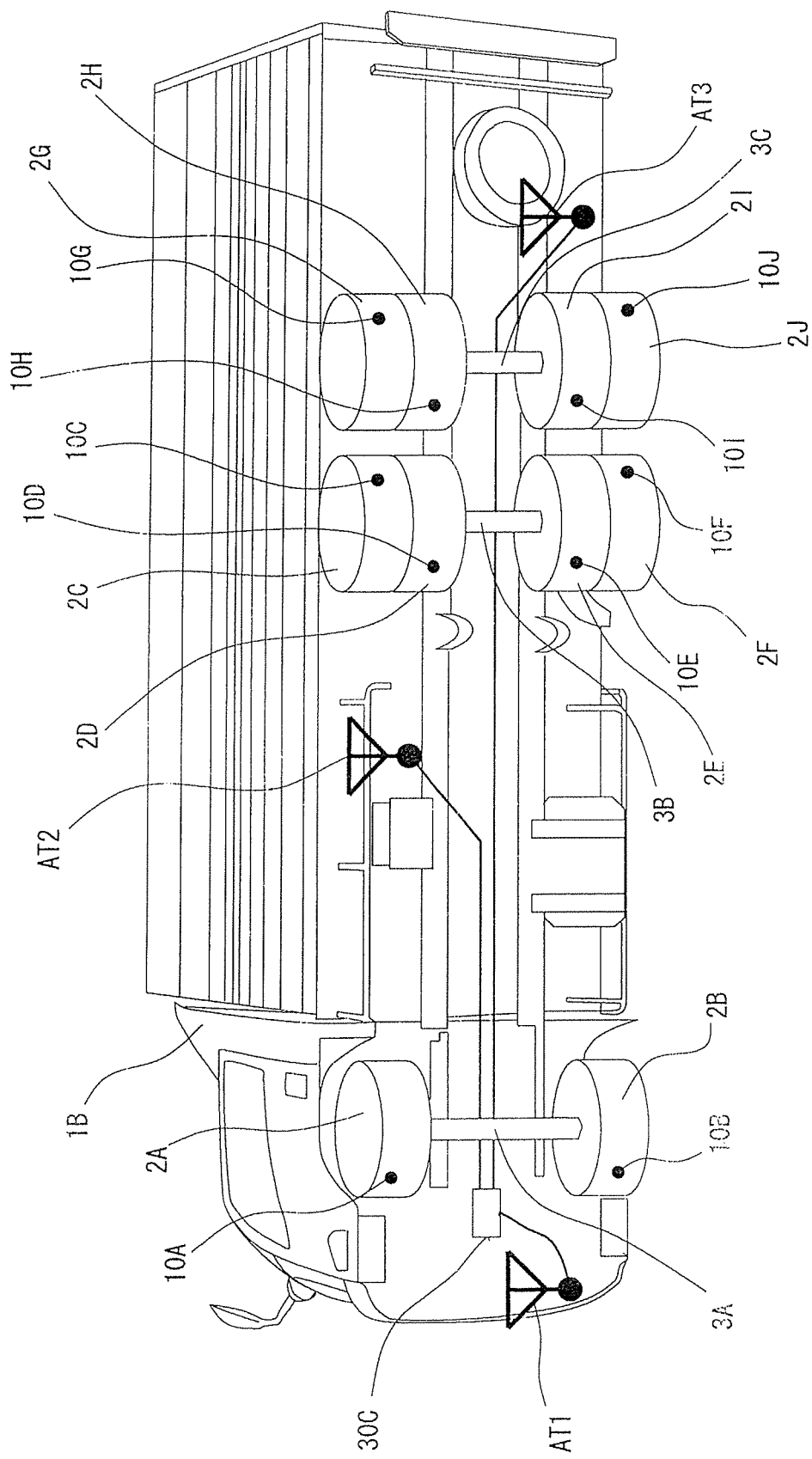
FIG. 21 is a perspective view of a wheel arrangement according to a third disclosed embodiment.
Figure 22:
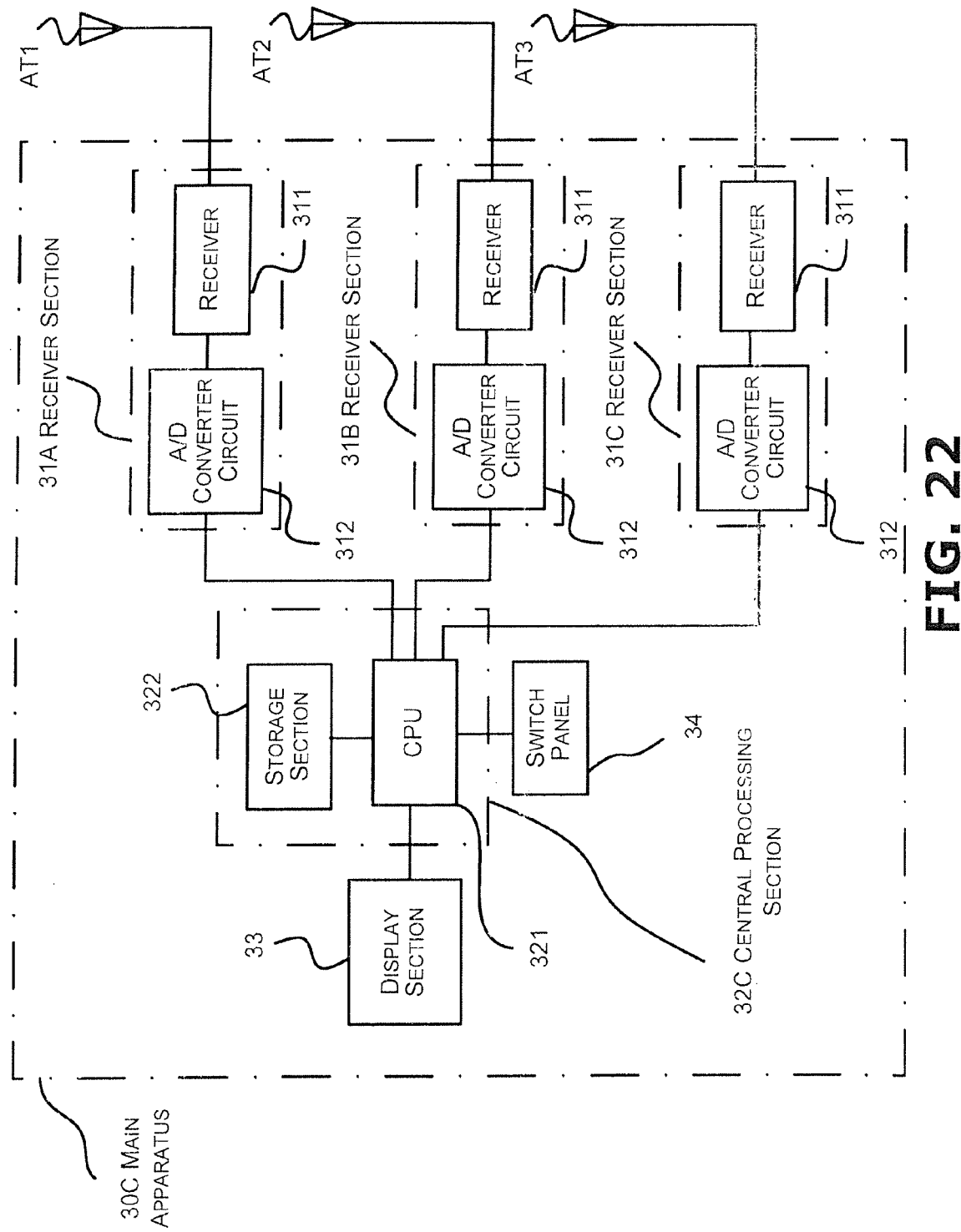
FIG. 22 is a block diagram showing an electric circuit of a main apparatus according to the third embodiment.

FIG. 21 is a perspective view of a wheel arrangement according to the third embodiment, and FIG. 22 is a block diagram showing an electric circuit of a main apparatus according to the third embodiment. In the drawings, parts that are the same as the parts of the first embodiment are indicated using the same reference numerals. One difference between the third embodiment and the first embodiment is that the third embodiment uses a vehicle 10B having ten wheels that include four dual wheels, has three antennas AT1, AT2, and AT3 provided on a bottom portion of the vehicle, and has a main apparatus 30C connected to the three antennas.

In the third embodiment, the vehicle 1B has one front wheel axle shaft 3A, two rear wheel axle shafts 3B and 3C arranged adjacent to each other, and a tire condition monitoring system. A method by which the tire condition monitoring system of the vehicle 1B automatically ascertains a wheel installation position will be explained. One wheel 2A or 2B is provided on each end of the front wheel axle shaft 3A, two wheels 2C to 2F are provided on each end of the rear wheel axle shaft 3B, and two wheels 2G to 2J are provided on each end of the rear wheel axle shaft 3C. The wheels 2C and 2D arranged adjacently on a left end of the frontward rear wheel axle shaft 3B constitute a dual wheel, and the wheels 2E and 2F arranged adjacently on a right end of the wheel axle shaft 3B constitute a dual wheel. Likewise, the wheels 2G and 2H arranged adjacently on a left end of the rearward rear wheel axle shaft 3C constitute a dual wheel, and the wheels 2I and 2J arranged adjacently on a right end of the wheel axle shaft 3C constitute a dual wheel. The wheels 2D, 2E, 2H, and 2I are inside wheels of the dual wheels, and the wheels 2C, 2F, 2G, 2J are outside wheels of the dual wheels.

On a bottom portion of the vehicle 1B, the antenna AT1 is installed in a position frontward of the right front wheel, the antenna AT2 is installed in a position frontward of the left rear wheels, and the antenna AT3 is installed in a position rearward of the right rear wheels. The three antennas AT1, AT2, and AT3 are connected to a main apparatus 30C provided near a driver's seat. A tire condition measuring device 10A to 10J is installed in each of the wheels 2A to 2J and serves to measure a temperature and an air pressure of the space inside a tire of each of the wheels 2A to 2J. The constituent features of the tire condition measuring devices 10A to 10J are the same as in the previously explained first embodiment.

As shown in FIG. 22, the main apparatus 30C of the third embodiment comprises three receiver sections 31A, 31B, and 31C, a central processing section 32C, a display section 33, and a switch panel 34 and these components are driven by electric power supplied from a battery of the vehicle. The receiver section 31A comprises a receiver 311 and an A/D converter circuit 312. An input side of the receiver 311 is connected to the antenna AT1. After a high-frequency electromagnetic signal having a frequency f1 has been received from the tire condition measuring devices 10A to 10J and inspected, the electromagnetic signal is outputted to the central processing section 32C through the A/D converter circuit 312. The receiver section 31A also outputs a strength value of the received signal to the central processing section 32C as information indicating a received signal strength.

The receiver section 31B comprises a receiver 311 and an A/D converter circuit 312. An input side of the receiver 311 is connected to the antenna AT2. After a high-frequency electromagnetic signal having a frequency f1 has been received from the tire condition measuring devices 10A to 10J and inspected, the electromagnetic signal is outputted to the central processing section 32C through the A/D converters circuit 312. The receiver section 31B also outputs a strength value of the received signal to the central processing section 32C as information indicating a received signal strength.

The receiver section 31C comprises a receiver 311 and an A/D converter circuit 312. An input side of the receiver 311 is connected to the antenna AT3. After a high-frequency electromagnetic signal having a frequency f1 has been received from the tire condition measuring devices 10A to 10J and inspected, the electromagnetic signal is outputted to the central processing section 32C through the A/D converter circuit 312. The receiver section 31C also outputs a strength value of the received signal to the central processing section 32C as information indicating a received signal strength.

The central processing section 32C comprises a well-known CPU 321 and memory section 322 and serves to execute computer processing of sensor detection information received from the tire condition measuring devices 10A to 10J to obtain tire air pressure information and tire temperature information and display the obtained information on the display section 33. The central processing section 32C displays the information based on identification information of the tire condition measuring devices 10A to 10J. The identification information of each of the tire condition measuring devices 10A to 10J is associated with one of the wheel installation positions stored in the storage section 322. After a reset switch on the switch panel 34 is pressed and the system has been reset, the central processing section 32C automatically executes a process of associating the tire condition measuring devices 10A to 10J installed in the tires of the wheels 2A to 2J with the wheel installation positions. This association processing will be explained in more detail later.

The storage section 322 comprises a ROM in which a program executed by the CPU 321 is stored and a non-volatile semiconductor memory that is electrically rewritable, e.g., an EEPROM (electrically erasable programmable read-only memory). Such information as a number of wheels, a number of dual wheels, and positional relationships among the installation positions of the wheels 2A to 2J and the antennas AT1, AT2, and AT3 are received from an external source and stored in advance in a region designated as rewritable inside the storage section 322 when the main apparatus 30C is installed in the vehicle.

The display section 33 serves to display sensor detection information that the CPU 321 receives from each of the tire condition measuring devices 10A to 10J. Similar to the first embodiment, the display section 33 comprises a display panel (not shown) and serves to display a variety of information.

Figure 23:
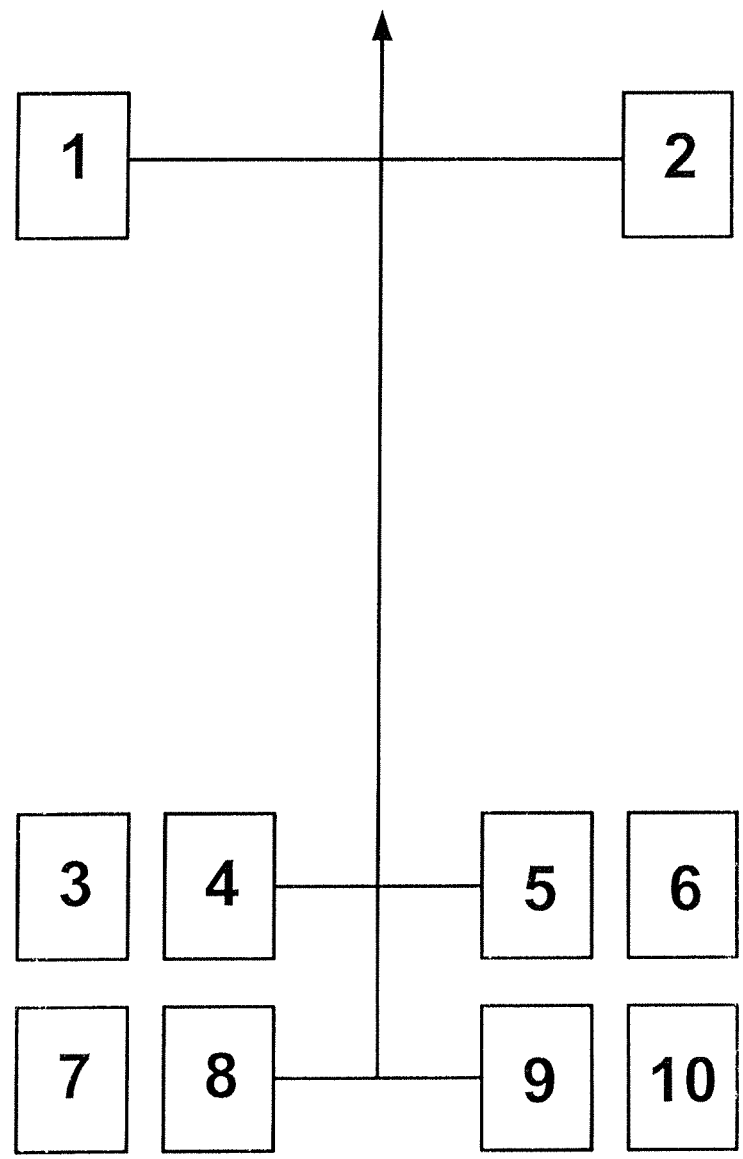
FIG. 23 illustrates a relationship between wheel positions and position numbers in the second embodiment.

Actual measurement data related to the process of associating the tire condition measuring devices 10A to 10J with the wheel installation positions will now be presented. FIG. 24 shows average values (dBm) of received signal strength levels (RSSI: received signal strength indication) of radio signals received from the tire condition measuring devices 10A to 10J of the wheels 2A to 2J as received by the main apparatus 30C through the three antennas AT1, AT2, and AT3. The values are associated with the wheel position numbers shown in FIG. 7 and indicated in the table in terms of four levels: Very Strong, Strong, Medium, and Weak. As shown in FIG. 23, the wheel installation position numbers are defined such that number 1 is the front left wheel, number 2 is the front right wheel, number 3 is the outside wheel of the frontward rear left dual wheel, number 4 is the inside wheel of the frontward rear left dual wheel, number 5 is the inside wheel of the rear right dual wheel, number 6 is the outside wheel of the rear right dual wheel, number 7 is the outside wheel of the rearward rear left dual wheel, number 8 is the inside wheel of the rearward rear left dual wheel, number 9 is the inside wheel of the rearward rear right dual wheel, number 10 is the outside wheel of the rearward rear right dual wheel.

As shown in FIG. 24, among the radio signals received by the antenna AT1, the radio signal received from the tire condition measuring device 10A installed on the wheel 2A located at the number 1 wheel installation position has a "Strong" average received signal strength, the radio signal received from the tire condition measuring device 10B installed on the wheel 2B located at the number 2 wheel installation position has a "Very Strong" average received signal strength, and the radio signals received from the tire condition measuring devices 10C and 10D installed on the wheels 2C and 2D located at the number 3 and number 4 wheel installation positions have "Medium" average received signal strengths. Also, the radio signals received from the tire condition measuring devices 10E and 10F installed on the wheels 2E and 2F located at the number 5 and number 6 wheel installation positions have "Medium" average received signal strengths, the radio signals received from the tire condition measuring devices 10G and 10H installed on the wheels 2G and 2H located at the number 7 and number 8 wheel installation positions have "Weak" average received signal strengths, and the radio signals received from the tire condition measuring devices 10I and 10J installed on the wheels 2I and 2G located at the number 9 and number 10 wheel installation positions have "Weak" average received signal strengths.

Among the radio signals received by the antenna AT2, the radio signal received from the tire condition measuring device 10A installed on the wheel 2A located at the number 1 wheel installation position has a "Very Strong" average received signal strength, the radio signal received from the tire condition measuring device 10B installed on the wheel 2B located at the number 2 wheel installation position has a "Strong" average received signal strength, and the radio signals received from the tire condition measuring devices 10C and 10D installed on the wheels 2C and 2D located at the number 3 and number 4 wheel installation positions have "Very Strong" average received signal strengths. Also the radio signals received from the tire condition measuring devices 10E and 10F installed on the wheels 2E and 2F located at the number 5 and number 6 wheel installation positions have "Strong" average received signal strengths, the radio signals received from the tire condition measuring devices 10G and 10H installed on the wheels 2G and 2H located at the number 7 and number 8 wheel installation positions have "Very Strong" average received signal strengths, and the radio signals received from the tire condition measuring devices 10I and 10J installed on the wheels 2I and 2G located at the number 9 and number 10 wheel installation positions have "Strong" average received signal strengths.

Meanwhile, among the radio signals received by the antenna AT3, the radio signal received from the tire condition measuring device 10A installed on the wheel 2A located at the number 1 wheel installation position has a "Weak" average received signal strength, the radio signal received from the tire condition measuring device 10B installed on the wheel 2B located at the number 2 wheel installation position has a "Weak" average received signal strength, and the radio signals received from the tire condition measuring devices 10C and 10D installed on the wheels 2C and 2D located at the number 3 and number 4 wheel installation positions have "Medium" average received signal strengths. Also, the radio signals received from the tire condition measuring devices 10E and 10F installed on the wheels 2E and 2F located at the number 5 and number 6 wheel installation positions have "Strong" average received signal strengths, the radio signals received from the tire condition measuring devices 10G and 10H installed on the wheels 2G and 2H located at the number 7 and number 8 wheel installation positions have "Strong" average received signal strengths, and the radio signals received from the tire condition measuring devices 10I and 10J installed on the wheels 2I and 2G located at the number 9 and number 10 wheel installation positions have "Very Strong" average received signal strengths.

Figure 25:
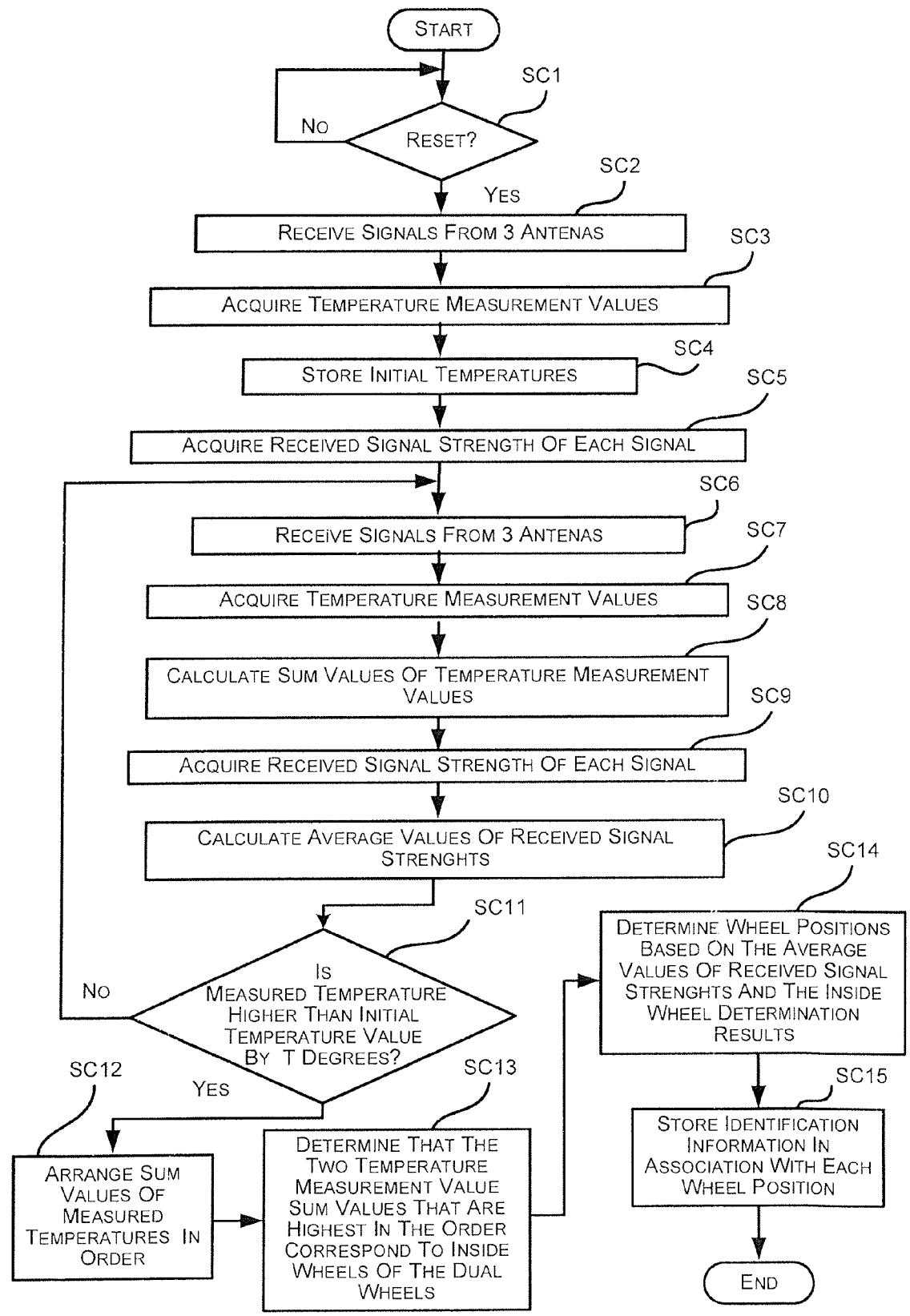
FIG. 25 is a flowchart explaining a wheel position determining process according to the third embodiment.

The process by which the main apparatus 30C according to the third embodiment associates each of the tire condition measuring devices 10A to 10J with one of the wheel installation positions will now be explained in detail with reference to the flowchart shown in FIG. 25. When a system user has changed a tire or performed a tire rotation (rearrangement of the tire positions), the user resets the system by pushing the reset switch on the switch panel 34 of the main apparatus 30C. As a result, the main apparatus 30C executes a process in which it automatically associates the identification information of the tire condition measuring device 10A to 10J installed on the tire of each of the wheels 2A to 2J with one of the wheel installation positions. Thus, after the reset switch has been pressed and the system has been reset (SC1), the CPU 321 of the main apparatus 30C receives signals transmitted from the tire condition measuring devices 10A to 10J through the antennas AT1, AT2, and AT3 (SC2), acquires internal air temperature measurement values of the tires from the received signals (SC3), and stores the temperature measurement values in the storage section 322 as initial temperature values associated with the identification information of each of the tire condition measuring devices 10A to 10J, respectively, extracted from the received signals (SC4).

The CPU 321 also acquires a received signal strength for each of the received signals and stores the received signal strengths in the storage section 322 in association with the identification information of each of the tire condition measuring devices 10A to 10J (SC5). Next, the CPU 321 of the main apparatus 30C receives signals from the tire condition measuring devices 10A to 10J through the three antennas AT1, AT2, and AT3 (SC6), acquires internal air temperature measurement values of the tires from the received signals (SC7), and calculates a sum of temperature measurement values associated with the identification information of each of the tire condition measuring devices 10A to 103 (SC8). In this embodiment, the temperature measurement values are added sequentially with respect to the identification information of each of the tire condition measuring devices 10A to 10J and the values resulting from the addition operations are stored in the storage section 322 in association with the identification information of the respective tire condition measuring devices 10A to 10J.

The CPU 321 also acquires received signal strengths for each of the received signals (SC9). The CPU 321 then calculates new average values of the received signal strengths based on the received signal strength value, a sum value of the received signal strengths stored in the storage section 322, and the number of signal receptions, stores the newly calculated average values in the storage section 322 as new average values associated with the identification information of each of the tire condition measuring devices 10A to 10J, and updates the sum value of received signal strengths and the number of signal receptions stored in the storage section 322 in association with the identification information of each of the tire condition measuring devices 10A to 10F (SC10). With respect to the identification information of each of the tire condition measuring devices 10A to 10J, the CPU 321 then compares the temperature measurement value acquired from the received signal to the initial temperature value stored in the storage section 322 and determines if the measured temperature value associated with the respective identification information is larger than the corresponding initial temperature value by an amount equal to or larger than T degrees (SC11). Similar to the first embodiment, the value of T is set to 20 degrees C.

If the result of SC11 is that the measured temperature value is not higher than the initial temperature value by an amount equal to or larger than T degrees, then the CPU 321 proceeds to the aforementioned step SC6. If the measured temperature value is higher than the initial value by an amount equal to or larger than T degrees, then the CPU 321 arranges the sum values of the measured temperatures in order from high to low (SC12) and determines that the four sum values (where "four" corresponds to the number of dual wheels) highest in the order are sum values of the internal air temperatures of the tires installed on the inside wheels 2D, 2E, 2H, and 2I of the dual wheels, thereby ascertaining the identification information corresponding to those four wheels (SC13).

Next, the CPU 321 determines the wheel position corresponding to each identification information based on the average values of the received signal strengths and the results of the determination of the inside wheels of the dual wheels executed in SC13 (SC14). Then, the CPU 321 stores the wheel positions and the identification information of each of the tire condition measuring devices 10A to 10J in the storage section 322 such that each of the wheel positions is associated with the corresponding identification information (SC15) and ends the process of associating the wheel installation positions with the tire condition measuring devices 10A to 10J.

Which wheels of the dual wheels are inside wheels and which are outside wheels can be determined based on the internal air temperatures of the tires, and the respective wheel installation positions of the tires on which the tire condition measuring devices 10A to 10J are installed can be determined based on the average values of the received signal strengths of the radio signals transmitted from the tire condition measuring devices 10A to 10J. In this embodiment, the accuracy is improved by receiving the signals using three antennas AT1, AT2, and AT3. The reason for using average values of the received signal strengths is the same in this embodiment as explained previously regarding the first embodiment.

Also, in this embodiment, the temperature measurement values acquired from the signals received from the tire condition measuring devices 10A to 10J are summed sequentially in association with the identification information of each of the tire condition measuring devices 10A to 10J and the sum values are arranged in order from highest to lowest. The sum values highest in the order are then determined to be sum values of the temperature measurement values of the tires installed on the inside wheels of the dual wheels. However, it is also acceptable to find average values instead of sum values of the temperature measurement values, arrange the average values in order, and determine that the average values highest in the order, i.e., the largest average values, are average values of the temperature measurement values of the tires installed on the inside wheels of the dual wheels. It is also acceptable to calculate differences between the initial temperature measurement values stored in the storage section and the temperature measurement values acquired from the received signals, i.e., calculate difference values by subtracting the initial temperature values from the temperature measurement values acquired from the received signals, and determine that the difference values that are highest in the order when the difference values are arranged from largest to smallest, i.e., determine that the largest difference values, correspond to the temperature measurement values of the tires installed on the inside wheels of the dual wheels.

A fourth disclosed embodiment will now be explained.

Figure 26:
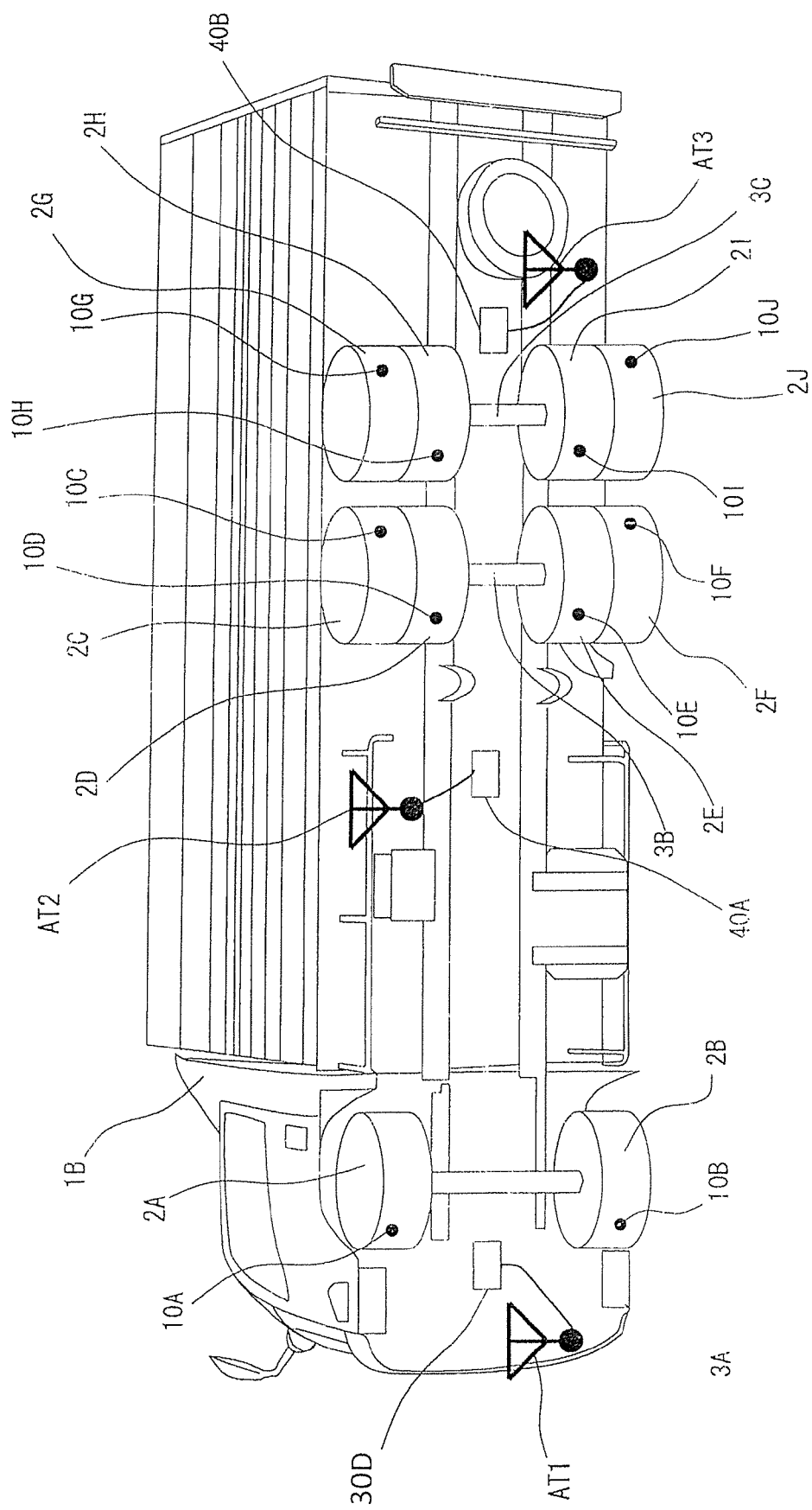
FIG. 26 is a perspective view of a wheel arrangement according to a fourth disclosed embodiment.
Figure 27:
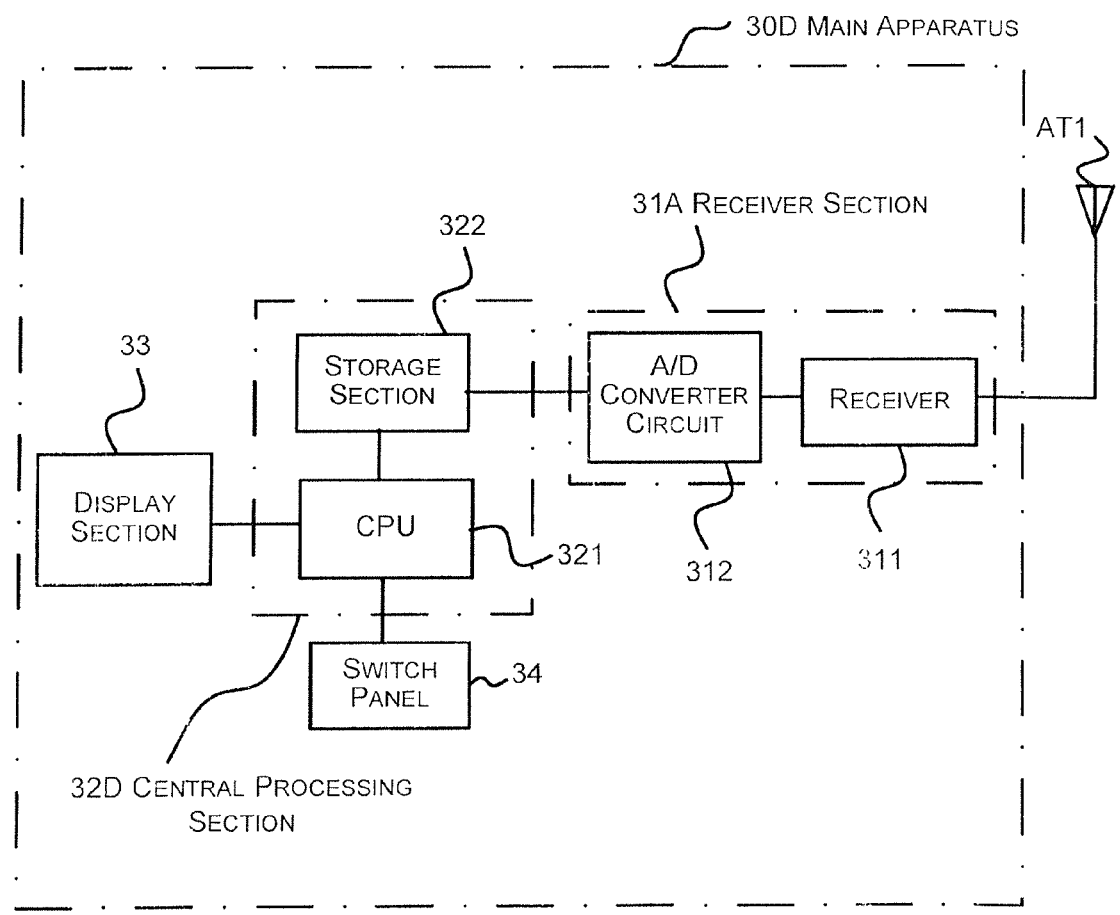
FIG. 27 is a block diagram showing an electric circuit of a main apparatus according to the fourth embodiment.

In FIGS. 26 and 27, parts that are the same as the parts of the first and third embodiment are indicated using the same reference numerals.

Examples of differences between the fourth embodiment and the third embodiment are that in the fourth embodiment two relay devices 40A and 40B are provided, only the antenna AT1 located on a frontward portion of the vehicle 1B is connected directly to the main apparatus 30D, and the other two antennas AT2 and AT3 are connected to the relay devices 40A and 40B. As shown in FIG. 27, the main apparatus 30D of the fourth embodiment comprises one receiver section 31A, a central processing section 32D, a display section 33, and a switch panel 34 and these components are driven by electric power supplied from a battery of the vehicle.

The receiver section 31A comprises a receiver 311 and an A/D converter circuit 312. An input side of the receiver 311 is connected to the antenna AT1. After a high-frequency electromagnetic signal having a frequency f1 has been received from the tire condition measuring devices 10A to 10J and the relay devices 40A and 40B and inspected, the electromagnetic signal is outputted to the central processing section 32D through the A/D converter circuit 312. The receiver section 31A also outputs a strength value of the received signal to the central processing section 32D as information indicating a received signal strength.

The central processing section 32D comprises a well-known CPU 321 and memory section 322 and serves to execute computer processing of sensor detection information received from the tire condition measuring devices 10A to 10J and the relay devices 40A and 40B to obtain tire air pressure information and tire temperature information and display the obtained information on the display section 33. The central processing section 32D displays the information based on identification information of the tire condition measuring devices 10A to 10J. The identification information of each of the tire condition measuring devices 10A to 10J is associated with one of the wheel installation positions stored in the storage section 322. After a reset switch on the switch panel 34 is pressed and the system has been reset, the central processing section 32D automatically executes a process of associating the tire condition measuring devices 10A to 10J installed in the tires of the wheels 2A to 23 with the wheel installation positions. This association processing will be explained in more detail later.

The storage section 322 comprises a ROM in which a program executed by the CPU 321 is stored and a non-volatile semiconductor memory that is electrically rewritable, e.g., an EEPROM (electrically erasable programmable read-only memory). Such information as a number of wheels, a number of dual wheels, positional relationships among the installation positions of the wheels 2A to 2J and the antennas AT1, AT2, and AT3, identification information of the relay device 40A connected to the antenna AT2, and identification information of the relay device 40B connected to the antenna AT3 are received from an external source and stored in advance in a region designated as rewritable inside the storage section 322 when the main apparatus 30D is installed in the vehicle.

The display section 33 serves to display sensor detection information that the CPU 321 receives from each of the tire condition measuring devices 10A to 10J. Similar to the first embodiment, the display section 33 comprises a display panel (not shown) and serves to display a variety of information.

Figure 28:
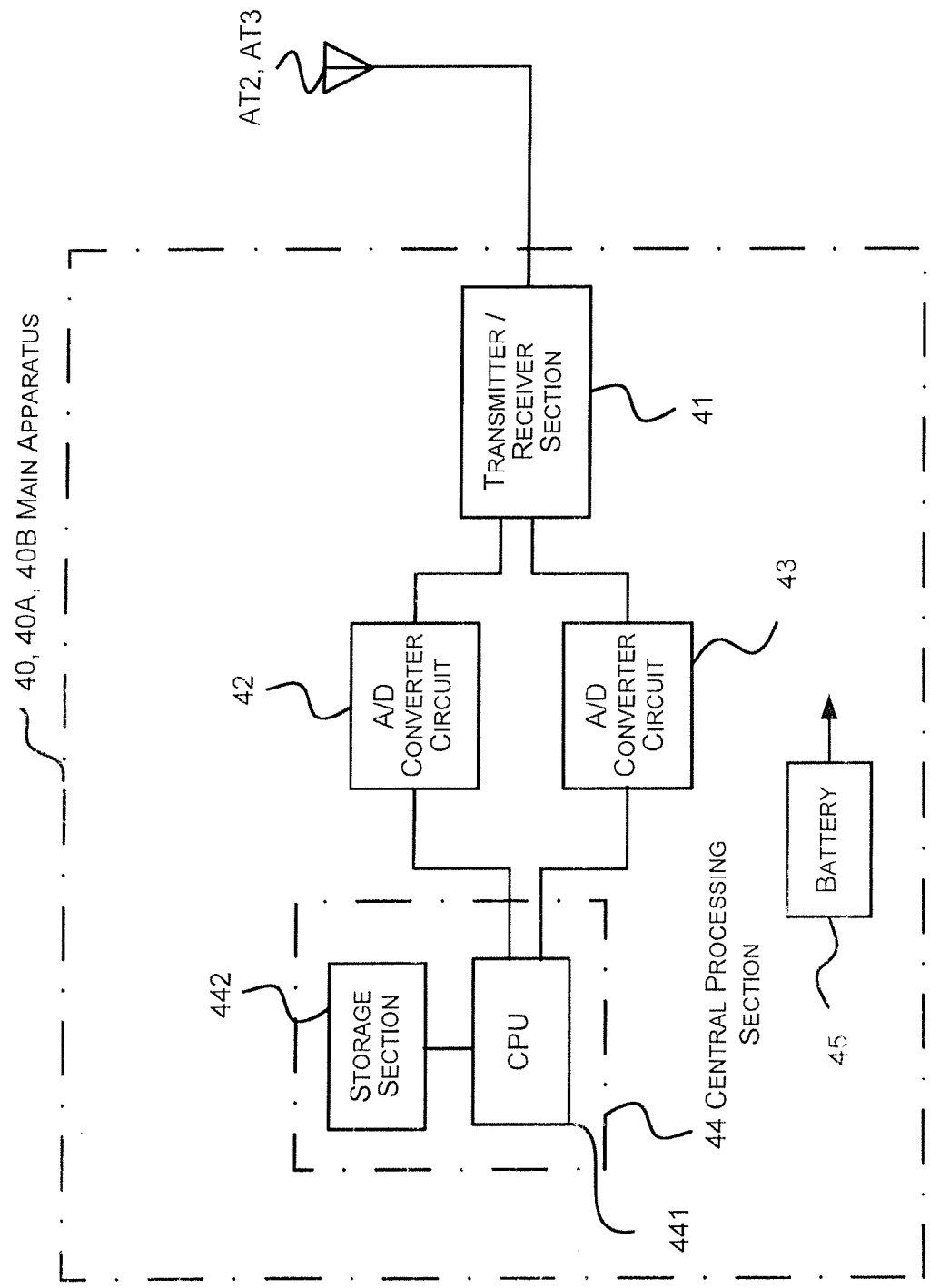
FIG. 28 is a block diagram showing an electric circuit of a relay device according to the fourth embodiment.

As shown in FIG. 28, each of the relay devices 40A and 40B comprises a transmitter/receiver section 41, an A/D converter circuit 42, a D/A converter circuit 43, a central processing section 44, and a battery 45 serving as an electric power source for driving these components. The transmitter/receiver section 41 is connected to the antenna AT2 or the antenna AT3. After a high-frequency electromagnetic signal having a frequency f1 has been received from the tire condition measuring devices 10A to 10J and the other relay device 40 (i.e., the relay device 40B or 40A that this transmitter/receiver section 41 is not part of) and inspected, the transmitter/receiver section 41 outputs the electromagnetic signal to the central processing section 44 through the A/D converter circuit 42. Additionally, the transmitter/receiver section 41 is also contrived to receive a high-frequency transmission information signal having a frequency f1 from the central processing section 44 through the D/A converter circuit 43 and transmit the signal through the antenna AT2 or the antenna AT3.

The central processing section 44 comprises a well-known CPU 441 and a storage section 442. The CPU 441 operates based on a program stored in a semiconductor memory of the storage section 422. When electric power is supplied and the system is driven, the CPU 441 adds relay device history information to sensor detection information received from the tire condition measuring devices 10A to 10J and the other relay device 40 and transmits the information through the transmitter/receiver section 41.

When it receives sensor detection information from the tire condition measuring devices 10A to 10J, the CPU 441 of the central processing section 44 acquires received signal strengths for each of the received signals. The CPU 441 then calculates new average values of each of the received signal strengths based on the received signal strength value, a sum value of the received signal strengths stored in the storage section 442, and the number of signal receptions, stores the newly calculated average values in the storage section 442 as new average values associated with the identification information of each of the tire condition measuring devices 10A to 10J, and updates the sum value of received signal strengths and the number of signal receptions stored in the storage section 422 in association with the identification information of each of the tire condition measuring devices 10A to 10J.

In this embodiment, the CPU 441 sequentially adds the received signal strength values corresponding to the identification information of each of the tire condition measuring devices 10A to 10J and stores the values resulting from the addition operations as sum values in the storage section 422 in association with the identification information of the respective tire condition measuring devices 10A to 10J. The CPU 441 uses the sum values to calculate average values. The CPU 441 of the central processing section 44 also adds information indicating the calculated average values of the received signal strengths and identification information of its own relay device 40 (i.e., the relay device 40A or 40B in which the CPU 441 is provided) serving as a relay device record to the received sensor detection information and transmits the information to the main apparatus 30D wirelessly using an electromagnetic signal having a frequency f1.

Also, when it receives sensor detection information from the other relay device 40 and the sensor information received from the other relay device 40 does not contain relay device history information, the CPU 441 of the central processing section 44 adds identification information of its own relay device 40 as a relay device record to the received sensor detection information and transmits the information to the main apparatus 30D wirelessly using an electromagnetic signal having a frequency f1. Thus, the program of the CPU 441 is contrived such that when information is transmitted by relay device, both identification information of the tire condition measuring device 10 that transmitted the received measurement result signal and identification information that is unique to the particular relay device 40 and serves as relay device history information are added to the detection data and the resulting transmission information (sensor detection information) is transmitted to the main apparatus 30D through the transmitter/receiver section 41. Also, in order to transmit information from the relay devices 40A and 40B, it is acceptable to transmit using the same antenna as is used for receiving or to provide a separate antenna for relay device transmission in each of the relay devices 40A and 40B.

The storage section 442 comprises a ROM in which the program executed by the CPU 441 is stored and a non-volatile semiconductor memory that is electrically rewritable, e.g., and EEPROM (electrically erasable programmable read-only memory). The identification information unique to each of the relay devices 40 is stored in advance in a region designated non-rewritable inside the storage section 442 at the time of manufacture. By using the relay devices 40A and 40B, information transmitted from a tire condition measuring device 10 and received with the antenna AT3 is, in turn, transmitted from the relay device 40B to the main apparatus 30D or the relay device 40A through the antenna AT3. Similarly, information transmitted from a tire condition measuring device 10 and received with the antenna AT2 is, in turn, transmitted from the relay device 40A to the main apparatus 30D through the antenna AT2. As a result, it is not necessary to provide wiring between the antennas AT2 and AT3.

Figure 29:
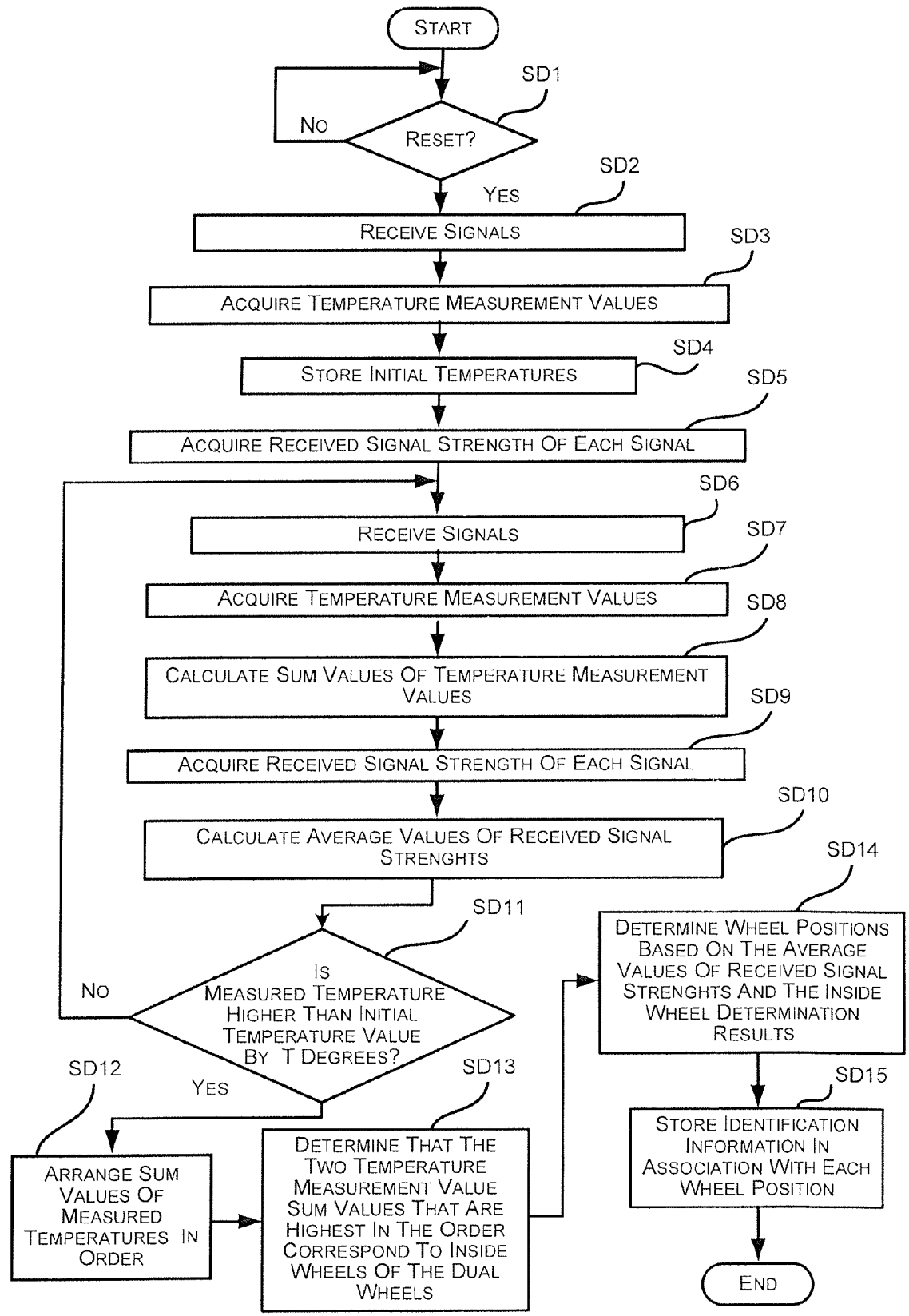
FIG. 29 is a flowchart explaining a wheel position determining process according to the fourth embodiment.

The process by which the main apparatus 30D according to the fourth embodiment associates each of the tire condition measuring devices 10A to 10J with one of the wheel installation positions will now be explained in detail with reference to the flowchart shown in FIG. 29. When a system user has changed a tire or performed a tire rotation (rearrangement of the tire positions), the user resets the system by pushing the reset switch on the switch panel 34 of the main apparatus 30D. As a result, the main apparatus 30D executes a process in which it automatically associates the identification information of the tire condition measuring device 10A to 10J installed in the tire of each of the wheels 2A to 2J with one of the wheel installation positions.

Thus, after the reset switch has been pressed and the system has been reset (SD1), the CPU 321 of the main apparatus 30D receives signals transmitted from the tire condition measuring devices 10A to 10J and the relay devices 40A and 4013 through the antenna AT1 (SD2) and acquires identification information of the tire condition measuring devices 10A to 10J, internal air temperature measurement values of the tires, and average values of the received signal strengths from the received signal (SD3). The reason for acquiring these values is that when the main apparatus 30D acquires signals from the relay devices 40A and 40B, it must use values that the relay devices 40A and 40B received from the tire condition measuring devices 10A to 10J as the received signal strengths to be used in determining wheel positions. The signal strengths of the signals received from the relay devices 40A and 40B cannot be used.

If sensor detection information indicating a tire condition of a particular wheel is received from both one of the tire condition measuring devices 2A to 2J and one of the relay devices 40A or 40B simultaneously, then the CPU 321 uses the information received directly from the tire condition measuring device 2A to 2J and discards the information received from the relay device 40A or 40B. Also, if sensor detection information is received from one of the relay devices 40A or 40B but the same sensor detection information cannot be received from one of the tire condition measurement devices 10A to 10J, then the CPU 321 uses the sensor detection information received from the relay device 40A or 40B to acquire a temperature measurement value and an average value of the received signal strength. Next, the CPU 321 stores the acquired temperature measurement values in the storage section 322 as initial temperature values associated with the identification information of each of the tire condition measuring devices 10A to 10J, respectively, extracted from the received signals (SD4).

The CPU 321 also acquires a received signal strength for each of the signals received from the tire condition measuring devices 10A to 10J and stores the received signal strengths in the storage section 322 in association with the identification information of each of the tire condition measuring devices 10A to 10J (SD5). Next, the CPU 321 of the main apparatus 30D receives signals from the tire condition determining apparatuses 10A to 10J and the relay devices 40A and 40B through the antenna AT1 (SD6), acquires tire internal air temperature measurement values and average values of the received signal strengths by executing the same processing as previously explained (SD7), and calculates a sum value of the temperature measurement values associated with each of the tire condition measuring devices 10A to 10J (SD8). In this embodiment, the temperature measurement values are added sequentially with respect to the identification information of each of the tire condition measuring devices 10A to 10J and the values resulting from the addition operations are stored in the storage section 322 in association with the identification information of the respective tire condition measuring devices 10A to 10J.

The CPU 321 also acquires a received signal strength for each of the signals received directly from the tire condition measuring devices 10A to 10J (SD9), calculates average values of the received signal strengths, and stores the calculated average values in the storage section 322 in association with the identification information of each of the tire condition measuring devices 10A to 10J (SD10). With respect to the identification information of each of the tire condition measuring devices 10A to 10J, the CPU 321 then compares the temperature measurement value acquired from the received signal to the initial temperature value stored in the storage section 322 and determines if the measured temperature value associated with the respective identification information is larger than the corresponding initial temperature value by an amount equal to or larger than T degrees (SD11). Similar to the first embodiment, the value of T is set to 20 degrees C.

If the result of SD11 is that the measured temperature value is not higher than the initial temperature value by an amount equal to or larger than T degrees, then the CPU 321 proceeds to the aforementioned step SD6. If the measured temperature value is higher than the initial value by an amount equal to or larger than T degrees, then the CPU 321 arranges the sum values of the measured temperatures in order from high to low (SD12) and determines that the four sum values (where "four" corresponds to the number of dual wheels) highest in the order are sum values of the internal air temperatures of the tires installed on the inside wheels 2D, 2E, 2H, and 2I of the dual wheels, thereby ascertaining the identification information corresponding to those four wheels (SD13).

Next, the CPU 321 determines the wheel position corresponding to each identification information based on the average values of the received signal strengths and the results of the determination of the inside wheels of the dual wheels executed in SD13 (SD14). Then, the CPU 321 stores the wheel positions and the identification information of each of the tire condition measuring devices. 10A to 10J in the storage section 322 such that each of the wheel positions is associated with the corresponding identification information (SD15) and ends the process of associating the wheel installation positions with the tire condition measuring devices 10A to 10J.

Which wheels of the dual wheels are inside wheels and which are outside wheels can be determined based on the internal air temperatures of the tires, and the respective wheel installation positions of the tires on which the tire condition measuring devices 10A to 10J are installed can be determined based on the average values of the received signal strengths of the radio signals transmitted from the tire condition measuring devices 10A to 10J. The reason for using average values of the received signal strengths is the same in this embodiment as explained previously regarding the first embodiment.

When relay devices 40A and 40B are used as in this embodiment, it is obviously necessary to use signal strength values of the signals received by the relay devices 40A and 40B from the tire condition measuring devices 10A to 10J. In such a case, the processing executed by the CPU 321 of the main apparatus 30D can be contrived to use a method in which received signal strengths of signals received from the tire condition measuring devices 10A to 10J through the antenna of the relay device 40 (i.e., the relay device 40A or 40B in which the CPU 441 is provided) and received signal strengths of signals received by the relay devices 40A and 40B from the tire condition measuring devices 10A to 10J are transmitted from the relay devices 40A and 40B to the main apparatus 30D as information, or a method in which average values of the received signal strengths of the signals from the tire condition measuring devices 10A to 10J are calculated at the relay devices 40A and 40B and the average value information is transmitted from the relay devices 40A and 40B to the main apparatus 30D, as is done in the embodiment explained above. It is also acceptable to determine an order of detected temperatures detected by the tire condition measuring devices 10A to 10J independently at each of the relay devices 40A and 40B and transmit the determination results to the main apparatus 30D. Thus, when relay devices 40A and 40B are used, the main apparatus 30D uses information contained in data received from the relay devices 40A and 40B to determine wheel positions.

Also, in this embodiment, the temperature measurement values acquired from the signals received from the tire condition measuring devices 10A to 10J are summed sequentially in association with the identification information of each of the tire condition measuring devices 10A to 10J and the sum values are arranged in order from highest to lowest. The sum values highest in the order are then determined to be sum values of the temperature measurement values of the tires installed on the inside wheels of the dual wheels. However, it is also acceptable to find average values instead of sum values of the temperature measurement values, arrange the average values in order, and determine that the average values highest in the order, i.e., the largest average values, are average values of the temperature measurement values of the tires installed on the inside wheels of the dual wheels. It is also acceptable to calculate differences between the initial temperature measurement values stored in the storage section and the temperature measurement values acquired from the received signals, i.e., calculate difference values by subtracting the initial temperature values from the temperature measurement values acquired from the received signals, and determine that the difference values that are highest in the order when the difference values are arranged from largest to smallest, i.e., determine that the largest difference values, correspond to the temperature measurement values of the tires installed on the inside wheels of the dual wheels.

Regarding a dual wheel used in a commercial vehicle, the invention enables a tire condition measuring device installed in a tire mounted on an inside wheel of the dual wheel to be distinguished from a tire condition measuring device installed in a tire mounted on an outside wheel of the dual wheel. Consequently, the invention can be applied to an automatic detection of tire mounting positions executed by a tire condition monitoring system used in a commercial vehicle having double tires (dual wheels).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "outboard", inboard", "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

While only selected embodiments have, been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A tire condition monitoring system provided on a vehicle having a plurality of tires including two tires arranged adjacently on a dual wheel, the tire condition monitoring system comprising:
    a plurality of tire condition measuring devices, each provided on one of the tires; and
    a monitoring apparatus provided on a main body of the vehicle, each of the tire condition measuring devices being configured to measure an air pressure and a temperature of a tire and transmit by a wireless signal a measurement result together with identification information unique to the particular tire condition measuring device, the monitoring apparatus comprising:
        a receiver configured to receive signals transmitted from the tire condition measuring devices via at least one receiving antenna provided on a main body of the vehicle;
        a storage device configured to store measurement results and identification information received by the receiver;
        a comparator configured to compare the received measurement results to a past measurement results stored in the storage device;
        a dual wheel count storage device to receive information indicating how many dual wheels are provided and to store the number of dual wheels;
        a reset switch;
        an initial temperature value storage device configured to store temperature values received from the tire condition measuring devices after the reset switch has been pressed and the monitoring apparatus has been reset as initial temperature values that are associated with the identification information of the respective tire condition measuring devices that measured the temperature values; and
        an inside tire determining device configured to compare a temperature value received from the tire condition measuring device to an initial temperature value stored in the initial temperature value storage device for each identification information, and when one of the received temperature values exceeds the initial temperature value corresponding to the same identification information by an amount equal to or larger than a preset temperature difference (T degrees), the inside tire determining device ascertains which of the identification information corresponds to a tire condition measuring device installed in a tire mounted on an inside wheel of a dual wheel of the vehicle by arranging calculated values that are calculated based on the temperature values received from each of the tire condition measuring devices in an order and determining that a number of the calculated values high in the order are calculated values of temperatures of tires mounted on the inside wheel of a dual wheel, where the number of calculated values is equivalent to the number of dual wheels of the vehicle.

2. The tire condition monitoring system according to claim 1, further comprising
    an adder configured to add temperature values received from each of the tire condition measuring devices for each identification information after the monitoring apparatus has been reset to provide added temperature values as the calculated values; and
    wherein the inside tire determining device ascertains which of the identification information corresponds to a tire condition measuring device installed in a tire mounted on an inside wheel of a dual wheel of the vehicle by arranging the added temperature values that are calculated based on the temperature values received from each of the tire condition measuring devices in an order and determining that a number of the added temperature values high in the order are added temperature values of temperatures of tires mounted on the inside wheel of a dual wheel, where the number of added temperature values is equivalent to the number of dual wheels of the vehicle.

3. The tire condition monitoring system according to claim 1, further comprising
    a subtractor configured to subtract initial temperature values stored in the initial temperature storing device from the temperature values received from the tire condition measuring devices to provide difference values as the calculated values; and
    wherein the inside tire determining device ascertains which of the identification information corresponds to a tire condition measuring device installed in a tire mounted on an inside wheel of a dual wheel of the vehicle by arranging the difference values obtained by subtracting the initial temperature values stored in the initial temperature storing device from the temperature values received from the tire condition measuring devices in an order and determining that a number of the difference values high in the order are difference values corresponding to tires mounted on the inside wheel of a dual wheel, where the number of difference values is equivalent to the number of dual wheels of the vehicle.

4. The tire condition monitoring system according to claim 1, wherein
    the vehicle is a six-wheeled vehicle having dual wheels as left and right rear wheels;
    the receiving antenna is mounted on the main body of the vehicle near a front wheel axle shaft of the vehicle in a position leftward or rightward of a center axis extending in a longitudinal direction of the vehicle; and
    the monitoring apparatus further comprises a determining device configured to determine the following based on the received signals:
        one of the tire condition measuring devices that transmits a signal having a largest average value of received signal strength is installed in a tire of the one front wheel that is closest to the receiving antenna;

one of the tire condition measuring devices that transmits a signal having a second largest average value of received signal strength is installed in a tire of the other front wheel;
one of the tire condition measuring devices that transmits a signal having a third or fourth largest average value of received signal strength is installed in one of the two tires of the rear wheel that is located on the same side as the one front wheel; and
one of the tire condition measuring devices that transmits a signal having a fifth or sixth largest average value of received signal strength is installed in one of the two tires of the rear wheel that is located on the same side as the other front wheel.

5. The tire condition monitoring system according to claim 2, wherein
the vehicle is a six-wheeled vehicle having dual wheels as left and right rear wheels;
the receiving antenna is mounted on the main body of the vehicle near a front wheel axle shaft of the vehicle in a position leftward or rightward of a center axis extending in a longitudinal direction of the vehicle; and
the monitoring apparatus further comprises a determining device configured to determine the following based on the received signals:
one of the tire condition measuring devices that transmits a signal having a largest average value of received signal strength is installed in a tire of the one front wheel that is closest to the receiving antenna;
one of the tire condition measuring devices that transmits a signal having a second largest average value of received signal strength is installed in a tire of the other front wheel;
one of the tire condition measuring devices that transmits a signal having a third or fourth largest average value of received signal strength is installed in one of the two tires of the rear wheel that is located on the same side as the one front wheel; and
one of the tire condition measuring devices that transmits a signal having a fifth or sixth largest average value of received signal strength is installed in one of the two tires of the rear wheel that is located on the same side as the other front wheel.

6. The tire condition monitoring system according to claim 3, wherein
the vehicle is a six-wheeled vehicle having dual wheels as left and right rear wheels;
the receiving antenna is mounted on the main body of the vehicle near a front wheel axle shaft of the vehicle in a position leftward or rightward of a center axis extending in a longitudinal direction of the vehicle; and
the monitoring apparatus further comprises a determining device configured to determine the following based on the received signals:
one of the tire condition measuring devices that transmits a signal having a largest average value of received signal strength is installed in a tire of the one front wheel that is closest to the receiving antenna;
one of the tire condition measuring devices that transmits a signal having a second largest average value of received signal strength is installed in a tire of the other front wheel;
one of the tire condition measuring devices that transmits a signal having a third or fourth largest average value of received signal strength is installed in one of the two tires of the rear wheel that is located on the same side as the one front wheel; and
one of the tire condition measuring devices that transmits a signal having a fifth or sixth largest average value of received signal strength is installed in one of the two tires of the rear wheel that is located on the same side as the other front wheel.

7. The tire condition monitoring system according to claim 1, wherein
the vehicle is a six-wheeled vehicle having dual wheels as left and right rear wheels;
the at least one antenna is arranged as a first receiving antenna and a second receiving antenna mounted on the main body of the vehicle near a front wheel axle shaft of the vehicle in positions leftward and rightward of a center axis extending in a longitudinal direction of the vehicle; and
the monitoring device further comprises a determining device configured to determine the following based on signals received at the first receiving antenna and the second receiving antenna:
one of the tire condition measuring devices transmitting a signal having a largest average value of received signal strength at the first receiving antenna and the second largest average value of received signal strength at the second receiving antenna is installed in a tire of the one front wheel that is closest to the first receiving antenna;
one of the tire condition measuring devices transmitting a signal having a second largest average value of received signal strength at the first receiving antenna and a largest average value of received signal strength at the second receiving antenna is installed in a tire of the other front wheel;
one of the tire condition measuring devices transmitting a signal having a third or fourth largest average value of received signal strength at the first receiving antenna and a fifth or sixth largest average value of received signal strength at the second receiving antenna is installed in one of the two tires of the rear wheel that is located on the same side as the one front wheel; and
one of the tire condition measuring devices transmitting a signal having a fifth or sixth largest average value of received signal strength at the first receiving antenna and a third or fourth largest average value of received signal strength at the second receiving antenna is installed in one of the two tires of the rear wheel that is located on the same side as the other front wheel.

8. The tire condition monitoring system according to claim 2, wherein
the vehicle is a six-wheeled vehicle having dual wheels as left and right rear wheels;
the at least one antenna is arranged as a first receiving antenna and a second receiving antenna mounted on the main body of the vehicle near a front wheel axle shaft of the vehicle in positions leftward and rightward of a center axis extending in a longitudinal direction of the vehicle; and
the monitoring device further comprises a determining device configured to determine the following based on signals received at the first receiving antenna and the second receiving antenna:
one of the tire condition measuring devices transmitting a signal having a largest average value of received signal strength at the first receiving antenna and the second largest average value of received signal strength at the second receiving antenna is installed in a tire of the one front wheel that is closest to the first receiving antenna;

one of the tire condition measuring devices transmitting a signal having a second largest average value of received signal strength at the first receiving antenna and a largest average value of received signal strength at the second receiving antenna is installed in a tire of the other front wheel;

one of the tire condition measuring devices transmitting a signal having a third or fourth largest average value of received signal strength at the first receiving antenna and a fifth or sixth largest average value of received signal strength at the second receiving antenna is installed in one of the two tires of the rear wheel that is located on the same side as the one front wheel; and one of the tire condition measuring devices transmitting a signal having a fifth or sixth largest average value of received signal strength at the first receiving antenna and a third or fourth largest average value of received signal strength at the second receiving antenna is installed in one of the two tires of the rear wheel that is located on the same side as the other front wheel.

9. The tire condition monitoring system according to claim 3, wherein the vehicle is a six-wheeled vehicle having dual wheels as left and right rear wheels;

the at least one antenna is arranged as a first receiving antenna and a second receiving antenna mounted on the main body of the vehicle near a front wheel axle shaft of the vehicle in positions leftward and rightward of a center axis extending in a longitudinal direction of the vehicle; and the monitoring device further comprises a determining device configured to determine the following based on signals received at the first receiving antenna and the second receiving antenna:

one of the tire condition measuring devices transmitting a signal having a largest average value of received signal strength at the first receiving antenna and the second largest average value of received signal strength at the second receiving antenna is installed in a tire of the one front wheel that is closest to the first receiving antenna;

one of the tire condition measuring devices transmitting a signal having a second largest average value of received signal strength at the first receiving antenna and a largest average value of received signal strength at the second receiving antenna is installed in a tire of the other front wheel;

one of the tire condition measuring devices transmitting a signal having a third or fourth largest average value of received signal strength at the first receiving antenna and a fifth or sixth largest average value of received signal strength at the second receiving antenna is installed in one of the two tires of the rear wheel that is located on the same side as the one front wheel; and one of the tire condition measuring devices transmitting a signal having a fifth or sixth largest average value of received signal strength at the first receiving antenna and a third or fourth largest average value of received signal strength at the second receiving antenna is installed in one of the two tires of the rear wheel that is located on the same side as the other front wheel.

10. The tire condition monitoring system according to claim 1, wherein the vehicle has three or more wheel axle shafts and dual wheels are provided on both end portions of at least one of the wheel axle shafts;

the at least one receiving antenna is configured as a plurality of receiving antennas mounted on a main body of the vehicle in a position frontward of a front-most wheel axle shaft, a position rearward of a rearmost wheel axle shaft, and a position between two of the wheel axle shafts such that the receiving antennas are located alternately rightward or leftward of a center axis extending in a longitudinal direction of the vehicle as one moves from a frontward portion to a rearward portion of the vehicle; and the monitoring device further comprises an ascertaining device that is configured to ascertain the identification information of the tire condition measuring device installed in each of the tires based on determination results obtained by the inside tire determining means and based on average values of received signal strengths of the signals received by each of the receiving antennas from the tire condition measuring devices.

11. The tire condition monitoring system according to claim 10, wherein the vehicle is a ten-wheeled vehicle having one wheel axle shaft for front wheels, two adjacently arranged wheel axle shafts for rear wheels, and dual wheels provided on both end portions of each of the two wheel axle shafts for the rear wheels;

the at least one receiving antenna is configured as
a first receiving antenna mounted on a main body of the vehicle in a prescribed position located frontward of a front wheel axle shaft of the vehicle and near a tire mounted on one side of the same wheel axle shaft;

a second receiving antenna mounted on a main body of the vehicle in a prescribed position located between a front-most wheel axle shaft and the wheel axle shaft located second from the front and near a tire mounted on the wheel axle shaft located second from the front; and a third receiving antenna mounted on a main body of the vehicle in a prescribed position located rearward of a rearmost wheel axle shaft and near a tire mounted on the rearmost wheel axle shaft; and the monitoring device further comprises a determining device configured to determine the following based on the signals received at the first, second, and third receiving antennas:

one of the tire condition measuring devices transmitting a signal having a largest average value of received signal strength at the first receiving antenna is installed in a tire of the one front wheel that is closest to the first receiving antenna;

one of the tire condition measuring devices transmitting a signal having a second largest average value of received signal strength at the first receiving antenna is installed in a tire of the other front wheel;

one of the tire condition measuring devices transmitting a signal having a first or second largest average value of received signal strength at the second receiving antenna is installed in one of the two tires of a dual wheel that is mounted closest to the second receiving antenna on one side of the wheel axle shaft located second from the front;

one of the tire condition measuring devices transmitting a signal having a third or fourth largest average value of received signal strength at the second receiving antenna is installed in one of the two tires of a dual wheel that is mounted on the one side of the rearmost wheel axle shaft;

one of the tire condition measuring devices transmitting a signal having a first or second largest average value of received signal strength at the third receiving antenna is installed in one of the two tires of a dual wheel that is mounted closest to the third receiving antenna on the other side of the rearmost wheel axle shaft; and one of the tire condition measuring devices transmitting a signal having a third or fourth largest average value of received signal strength at the third receiving antenna is installed in one of the two tires of a dual wheel that is mounted on the other side of the wheel axle shaft located second from the front.

12. The tire condition monitoring system according to claim 10, further comprising at least one relay device with at least one receiving antenna among the receiving antennas located second from the front or rearward of the second receiving antenna being connected to the relay device;

the relay device including a receiver that is configured to receive the signals transmitted from the tire condition measuring devices and other relay devices through the receiving antennas connected to the relay device, generate transmission information comprising an average value of received signal strengths and a measurement result for each identification information of the tire condition measuring devices obtained from received signals and an identification information of any other relay device from which a signal was received, add an identification information of the relay device to the transmission information, and transmit the transmission information; and the monitoring device further comprising
a storage device configured to store an identification information each of the relay devices and a position of a receiving antenna connected to any of the relay devices; and
a device that is configured to ascertain which of the receiving antennas received the measurement result contained in the signal received from each of the tire condition measuring devices based on the relay device identification information contained in the received signals.

13. The tire condition monitoring system according to claim 1, wherein
the temperature difference is set to 20 degrees C.

14. An installation position ascertaining method for a tire condition monitoring system that includes a computer and which is installed in a vehicle having a plurality of tires including two tires arranged adjacently on a dual wheel, the installation position ascertaining method comprising operating the tire condition monitoring system to
receive information indicating how many dual wheels there are from an external source and store the number of dual wheels in a memory;
receives a wireless signal containing tire temperature information from a tire condition measuring device installed in an inside tire of the dual wheel;
store temperature values received from the tire condition measuring devices after a reset switch has been pressed and the tire condition monitoring system has been reset as initial temperature values that are associated with the identification information of the respective tire condition measuring devices that measured the temperature values;
provide calculated values based on the temperature values received from each of the tire condition measuring devices for each identification information after the system has been reset;
compare the temperature values received from the tire condition measuring devices to the initial temperature values stored in the memory with respect to each identification information; and
when one of the received temperature values exceeds the initial temperature value corresponding to the same identification information by an amount equal to or larger than a preset temperature difference (T degrees), ascertain which of the identification information corresponds to a tire condition measuring device installed in a tire mounted on an inside wheel of a dual wheel of the vehicle by arranging the calculated values in an order and determining that a number of the calculated values high in the order are calculated values of temperatures of tires mounted on the inside wheel of a dual wheel, where the number of calculated values is equivalent to the number of dual wheels of the vehicle.

15. The method according to claim 14, wherein
the operating of the tire condition monitoring system to provide the calculated values includes operating the tire condition monitoring system to add the temperature values received from each of the tire condition measuring devices for each identification information after the system has been reset to provide added values as the calculated values; and
the operating of the tire condition monitoring system to ascertain which of the identification information corresponds to a tire condition measuring device installed in a tire mounted on an inside wheel of a dual wheel of the vehicle includes arranging the added values in an order and determining that a number of the added values high in the order are added values of temperatures of tires mounted on the inside wheel of a dual wheel, where the number of added values is equivalent to the number of dual wheels of the vehicle.

16. The method according to claim 14, wherein
the operating of the tire condition monitoring system to provide the calculated values includes operating the tire condition monitoring system to subtract the initial temperature values stored in the initial temperature storing device from the temperature values received from the tire condition measuring devices to provide difference values as the calculated values; and
the operating of the tire condition monitoring system to ascertain which of the identification information corresponds to a tire condition measuring device installed in a tire mounted on an inside wheel of a dual wheel of the vehicle includes arranging the difference values obtained by subtracting initial temperature values stored in the initial temperature storing device from the temperature values received from the tire condition measuring devices in an order and determining that a number of the difference values high in the order are difference values corresponding to tires mounted on the inside wheel of a dual wheel, where the number of difference values is equivalent to the number of dual wheels of the vehicle.

17. The method according to claim 14, wherein
the vehicle has three or more wheel axle shafts and dual wheels are provided on both end portions of at least one of the wheel axle shafts;
a plurality of receiving antennas are mounted on a main body of the vehicle in a position frontward of a frontmost wheel axle shaft, a position rearward of a rearmost wheel axle shaft, and a position between two of the wheel axle shafts such that the receiving antennas are located alternately rightward or leftward of a center axis extending in a longitudinal direction of the vehicle as one moves from a frontward portion to a rearward portion of the vehicle; and
the method further includes operating the tire condition monitoring system to ascertain the identification information of the tire condition measuring device installed in each of the tires based on average values of received signal strengths of signals received by each of the receiving antennas from the tire condition measuring devices and based on identification information of the tire condition measuring devices specified to be installed in tires mounted on inside wheels of the dual wheels.

18. The method according to claim 15, wherein
the vehicle has three or more wheel axle shafts and dual wheels are provided on both end portions of at least one of the wheel axle shafts;
a plurality of receiving antennas are mounted on a main body of the vehicle in a position frontward of a frontmost wheel axle shaft, a position rearward of a rearmost wheel axle shaft, and a position between two of the wheel axle shafts such that the receiving antennas are located alternately rightward or leftward of a center axis extending in a longitudinal direction of the vehicle as one moves from a frontward portion to a rearward portion of the vehicle; and
the method further includes operating the tire condition monitoring system to ascertain the identification information of the tire condition measuring device installed in each of the tires based on average values of received signal strengths of signals received by each of the receiving antennas from the tire condition measuring devices and based on identification information of the tire condition measuring devices specified to be installed in tires mounted on inside wheels of the dual wheels.

19. The method according to claim 16, wherein
the vehicle has three or more wheel axle shafts and dual wheels are provided on both end portions of at least one of the wheel axle shafts;
a plurality of receiving antennas are mounted on a main body of the vehicle in a position frontward of a frontmost wheel axle shaft, a position rearward of a rearmost wheel axle shaft, and a position between two of the wheel axle shafts such that the receiving antennas are located alternately rightward or leftward of a center axis extending in a longitudinal direction of the vehicle as one moves from a frontward portion to a rearward portion of the vehicle; and
the method further includes operating the tire condition monitoring system to ascertain the identification information of the tire condition measuring device installed in each of the tires based on average values of received signal strengths of signals received by each of the receiving antennas from the tire condition measuring devices and based on identification information of the tire condition measuring devices specified to be installed in tires mounted on inside wheels of the dual wheels.

20. The method according to claim 14, further comprising setting the temperature difference to 20 degrees C.

* * * * *